United States Patent
Ishikawa et al.

(10) Patent No.: US 7,650,976 B2
(45) Date of Patent: *Jan. 26, 2010

(54) LOW-FRICTION SLIDING MEMBER IN TRANSMISSION, AND TRANSMISSION OIL THEREFOR

(75) Inventors: Takao Ishikawa, Yokohama (JP); Kiyotaka Nakamura, Yokohama (JP); Makoto Kano, Yokohama (JP); Takafumi Ueno, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/946,407

(22) Filed: Nov. 28, 2007

(65) Prior Publication Data
US 2008/0236984 A1 Oct. 2, 2008

Related U.S. Application Data

(63) Continuation of application No. 10/921,291, filed on Aug. 19, 2004, now Pat. No. 7,318,514.

(30) Foreign Application Priority Data

| Aug. 22, 2003 | (JP) | ............................ 2003-208366 |
| Aug. 22, 2003 | (JP) | ............................ 2003-208368 |
| Aug. 6, 2004 | (JP) | ............................ 2004-230038 |
| Aug. 6, 2004 | (JP) | ............................ 2004-230039 |

(51) Int. Cl.
*F16H 57/04* (2006.01)
*F16D 13/74* (2006.01)
*C04B 35/52* (2006.01)

(52) U.S. Cl. .................... 192/107 M; 428/408; 508/109
(58) Field of Classification Search ....................... None
See application file for complete search history.

(56) References Cited

U.S. PATENT DOCUMENTS

| 1,461 A | 12/1839 | Hall et al. |
| 2,189,788 A | 2/1940 | Freeman |

(Continued)

FOREIGN PATENT DOCUMENTS

CA 2009582 8/1990

(Continued)

OTHER PUBLICATIONS

U.S. Appl. No. 09/545,181, filed Apr. 7, 2000, Miyake et al.

(Continued)

*Primary Examiner*—Rodney H Bonck
(74) *Attorney, Agent, or Firm*—Foley & Lardner LLP

(57) ABSTRACT

A low-friction sliding member in a transmission is at least one of sliding members which are in slidable contact with each other in presence of a transmission oil composition. The low-friction sliding member includes a base material having a sliding section. A hard carbon thin film is coated at a sliding surface of the sliding section of the base material. The hard carbon thin film contains hydrogen in an amount not more than 20 atomic %. The transmission oil composition contains at least one of organic oxygen-containing compound and aliphatic amine compound.

8 Claims, 1 Drawing Sheet

U.S. PATENT DOCUMENTS

| | | | |
|---|---|---|---|
| 2,716,972 A | 9/1955 | Paul et al. | |
| 2,982,733 A | 5/1961 | Wright et al. | |
| 3,211,647 A | 10/1965 | Rosemary et al. | |
| 3,790,315 A | 2/1974 | Emanuelss et al. | |
| 3,846,162 A | 11/1974 | Bloom | |
| 3,932,228 A | 1/1976 | Sugiyama et al. | |
| 4,031,023 A | 6/1977 | Musser et al. | |
| 4,367,130 A | 1/1983 | Lemelson | |
| 4,385,880 A | 5/1983 | Lemelson | |
| 4,538,929 A | 9/1985 | Ehrentraut et al. | |
| 4,554,208 A | 11/1985 | MacIver et al. | |
| 4,645,610 A | 2/1987 | Born et al. | |
| 4,702,808 A | 10/1987 | Lemelson | |
| 4,712,982 A | 12/1987 | Inagaki et al. | |
| 4,755,237 A | 7/1988 | Lemelson | |
| 4,755,426 A | 7/1988 | Kokai et al. | |
| 4,783,368 A | 11/1988 | Yamamoto et al. | |
| 4,834,400 A | 5/1989 | Lebeck | |
| 4,842,755 A | 6/1989 | Dunn | |
| 4,859,493 A | 8/1989 | Lemelson | |
| 4,874,596 A | 10/1989 | Lemelson | |
| 4,919,974 A | 4/1990 | McCune et al. | |
| 4,933,058 A | 6/1990 | Bache et al. | |
| 4,943,345 A | 7/1990 | Asmussen et al. | |
| 4,960,643 A | 10/1990 | Lemelson | |
| 4,974,498 A | 12/1990 | Lemelson | |
| 4,980,021 A | 12/1990 | Kitamura et al. | |
| 4,980,610 A | 12/1990 | Varga | |
| 4,981,717 A | 1/1991 | Thaler | |
| 4,988,421 A | 1/1991 | Drawl et al. | |
| 4,992,082 A | 2/1991 | Drawl et al. | |
| 5,000,541 A | 3/1991 | DiMarcello et al. | |
| 5,021,628 A | 6/1991 | Lemelson | |
| 5,032,243 A | 7/1991 | Bache et al. | |
| 5,036,211 A | 7/1991 | Scott | |
| 5,040,501 A | 8/1991 | Lemelson | |
| 5,067,826 A | 11/1991 | Lemelson | |
| 5,077,990 A | 1/1992 | Plath | |
| 5,078,848 A | 1/1992 | Anttila et al. | |
| 5,087,608 A | 2/1992 | Chan et al. | |
| 5,096,352 A | 3/1992 | Lemelson | |
| 5,110,435 A | 5/1992 | Haberland | |
| 5,112,025 A | 5/1992 | Nakayama et al. | |
| 5,127,314 A | 7/1992 | Swain | |
| 5,131,941 A | 7/1992 | Lemelson | |
| 5,132,587 A | 7/1992 | Lemelson | |
| 5,142,785 A | 9/1992 | Grewal et al. | |
| 5,143,634 A | 9/1992 | Quinga et al. | |
| 5,148,780 A | 9/1992 | Urano et al. | |
| 5,187,021 A | 2/1993 | Vydra et al. | |
| 5,190,807 A | 3/1993 | Kimock et al. | |
| 5,190,824 A | 3/1993 | Itoh | |
| 5,202,156 A | 4/1993 | Yamamoto et al. | |
| 5,205,188 A | 4/1993 | Repenning et al. | |
| 5,205,305 A | 4/1993 | Yamakita | |
| H1210 H | 7/1993 | Jensen | |
| 5,232,568 A | 8/1993 | Parent et al. | |
| 5,237,967 A | 8/1993 | Willermet et al. | |
| 5,249,554 A | 10/1993 | Tamor et al. | |
| 5,255,783 A | 10/1993 | Goodman et al. | |
| 5,255,929 A | 10/1993 | Lemelson | |
| 5,284,394 A | 2/1994 | Lemelson | |
| 5,288,556 A | 2/1994 | Lemelson | |
| 5,295,305 A | 3/1994 | Hahn et al. | |
| 5,299,937 A | 4/1994 | Gow | |
| 5,317,938 A | 6/1994 | De Jaun, Jr. et al. | |
| 5,326,488 A | 7/1994 | Minokami et al. | |
| 5,332,348 A | 7/1994 | Lemelson | |
| 5,334,306 A | 8/1994 | Dautremont-Smith et al. | |
| 5,349,265 A | 9/1994 | Lemelson | |
| 5,358,402 A | 10/1994 | Reed et al. | |
| 5,359,170 A | 10/1994 | Chen et al. | |
| 5,360,227 A | 11/1994 | Lemelson | |
| 5,380,196 A | 1/1995 | Kelly et al. | |
| 5,401,543 A | 3/1995 | O'Neill et al. | |
| H1461 H | 7/1995 | Divita et al. | |
| 5,432,539 A | 7/1995 | Anderson | |
| 5,433,977 A | 7/1995 | Sarin et al. | |
| H1471 H | 8/1995 | Braun et al. | |
| 5,443,032 A | 8/1995 | Vichr et al. | |
| 5,447,208 A | 9/1995 | Lund et al. | |
| 5,456,406 A | 10/1995 | Lemelson | |
| 5,458,754 A | 10/1995 | Sathrum et al. | |
| 5,461,648 A | 10/1995 | Nauflett et al. | |
| 5,462,772 A | 10/1995 | Lemelson | |
| 5,464,667 A | 11/1995 | Koehler et al. | |
| 5,466,431 A | 11/1995 | Dorfman et al. | |
| 5,479,069 A | 12/1995 | Winsor | |
| 5,482,602 A | 1/1996 | Cooper et al. | |
| 5,491,028 A | 2/1996 | Sarin et al. | |
| 5,497,550 A | 3/1996 | Trotta et al. | |
| 5,509,841 A | 4/1996 | Winsor | |
| 5,516,729 A | 5/1996 | Dawson et al. | |
| 5,529,815 A | 6/1996 | Lemelson | |
| 5,531,878 A | 7/1996 | Vadgama et al. | |
| 5,541,566 A | 7/1996 | Deeney | |
| 5,547,716 A | 8/1996 | Thaler | |
| 5,551,959 A | 9/1996 | Martin et al. | |
| 5,552,675 A | 9/1996 | Lemelson | |
| 5,568,391 A | 10/1996 | Mckee | |
| 5,593,719 A | 1/1997 | Dearnaley et al. | |
| 5,616,372 A | 4/1997 | Conley et al. | |
| 5,619,889 A | 4/1997 | Jones et al. | |
| 5,628,881 A | 5/1997 | Lemelson | |
| 5,630,275 A | 5/1997 | Wexler | |
| 5,630,953 A | 5/1997 | Klink | |
| 5,653,300 A | 8/1997 | Lund et al. | |
| 5,669,144 A | 9/1997 | Hahn et al. | |
| 5,672,054 A | 9/1997 | Cooper et al. | |
| 5,688,557 A | 11/1997 | Lemelson et al. | |
| 5,698,272 A | 12/1997 | Smentkowski et al. | |
| 5,707,409 A | 1/1998 | Martin et al. | |
| 5,714,202 A | 2/1998 | Lemelson et al. | |
| 5,719,109 A | 2/1998 | Tokashiki et al. | |
| 5,723,207 A | 3/1998 | Lettington et al. | |
| 5,731,046 A | 3/1998 | Mistry et al. | |
| 5,735,769 A | 4/1998 | Takemura et al. | |
| 5,740,941 A | 4/1998 | Lemelson | |
| 5,775,817 A | 7/1998 | Gottemoller et al. | |
| 5,786,038 A | 7/1998 | Conley et al. | |
| 5,790,146 A | 8/1998 | Anderson et al. | |
| 5,793,390 A | 8/1998 | Claflin et al. | |
| 5,794,801 A | 8/1998 | Lemelson | |
| 5,799,549 A | 9/1998 | Decker et al. | |
| 5,806,557 A | 9/1998 | Helge | |
| 5,824,387 A | 10/1998 | Boutaghou et al. | |
| 5,834,708 A | 11/1998 | Svetal et al. | |
| 5,840,662 A | 11/1998 | Nibert et al. | |
| 5,843,571 A | 12/1998 | Sho | |
| 5,851,962 A | 12/1998 | Kaga | |
| 5,866,195 A | 2/1999 | Lemelson | |
| 5,871,805 A | 2/1999 | Lemelson | |
| 5,881,444 A | 3/1999 | Schaefer et al. | |
| 5,901,021 A | 5/1999 | Hirano et al. | |
| 5,910,940 A | 6/1999 | Guerra | |
| 5,927,897 A | 7/1999 | Attar | |
| 5,937,812 A | 8/1999 | Reedy et al. | |
| 5,940,975 A | 8/1999 | Decker et al. | |
| 5,945,214 A | 8/1999 | Ma et al. | |
| 5,947,710 A | 9/1999 | Cooper et al. | |
| 5,952,102 A | 9/1999 | Cutler | |
| 5,958,261 A | 9/1999 | Offer et al. | |
| 5,960,762 A | 10/1999 | Imai | |
| 5,967,250 A | 10/1999 | Lund et al. | |

| | | | | | | |
|---|---|---|---|---|---|---|
| 5,968,596 | A | 10/1999 | Ma et al. | 6,439,986 | B1 | 8/2002 | Myoung et al. |
| 5,975,686 | A | 11/1999 | Hauck et al. | 6,452,752 | B1 | 9/2002 | Boutaghou |
| 5,976,707 | A | 11/1999 | Grab | 6,468,642 | B1 | 10/2002 | Bray et al. |
| 5,992,268 | A | 11/1999 | Decker et al. | 6,471,979 | B2 | 10/2002 | New et al. |
| 5,993,938 | A | 11/1999 | Tsukuda et al. | 6,494,881 | B1 | 12/2002 | Bales et al. |
| 6,006,415 | A | 12/1999 | Schaefer et al. | 6,523,456 | B1 | 2/2003 | Kobayashi et al. |
| 6,015,597 | A | 1/2000 | David | 6,524,212 | B2 | 2/2003 | Ushijima et al. |
| 6,016,000 | A | 1/2000 | Moslehi | 6,534,141 | B1 | 3/2003 | Hull, Jr. et al. |
| 6,023,979 | A | 2/2000 | Bills et al. | 6,537,310 | B1 | 3/2003 | Palmaz et al. |
| 6,028,393 | A | 2/2000 | Izu et al. | 6,537,429 | B2 | 3/2003 | O'Donnell et al. |
| 6,051,298 | A | 4/2000 | Ko et al. | 6,543,394 | B2 | 4/2003 | Tinney |
| 6,056,443 | A | 5/2000 | Koike et al. | 6,544,308 | B2 | 4/2003 | Griffin et al. |
| 6,059,460 | A | 5/2000 | Ono et al. | 6,553,957 | B1 | 4/2003 | Ishikawa et al. |
| 6,059,830 | A | 5/2000 | Lippincott, III et al. | 6,557,968 | B2 | 5/2003 | Lee et al. |
| 6,071,597 | A | 6/2000 | Yang et al. | 6,562,445 | B2 | 5/2003 | Iwamura |
| 6,083,313 | A | 7/2000 | Venkatraman et al. | 6,562,462 | B2 | 5/2003 | Griffin et al. |
| 6,083,570 | A | 7/2000 | Lemelson et al. | 6,570,172 | B2 | 5/2003 | Kim et al. |
| 6,095,690 | A | 8/2000 | Niegel et al. | 6,572,651 | B1 | 6/2003 | De Scheerder et al. |
| 6,099,541 | A | 8/2000 | Klopotek | 6,572,935 | B1 | 6/2003 | He et al. |
| 6,099,976 | A | 8/2000 | Lemelson et al. | 6,572,937 | B2 | 6/2003 | Hakovirta et al. |
| 6,106,919 | A | 8/2000 | Lee et al. | 6,585,064 | B2 | 7/2003 | Griffin et al. |
| 6,124,198 | A | 9/2000 | Moslehi | 6,586,069 | B2 | 7/2003 | Dykes et al. |
| 6,139,964 | A | 10/2000 | Sathrum et al. | 6,589,640 | B2 | 7/2003 | Griffin et al. |
| 6,142,481 | A | 11/2000 | Iwashita et al. | 6,592,519 | B1 | 7/2003 | Martinez |
| 6,145,608 | A | 11/2000 | Lund et al. | 6,592,985 | B2 | 7/2003 | Griffin et al. |
| 6,156,439 | A | 12/2000 | Coffinberry | 6,601,662 | B2 | 8/2003 | Matthias et al. |
| 6,159,558 | A | 12/2000 | Wolfe et al. | 6,626,949 | B1 | 9/2003 | Townley |
| 6,160,683 | A | 12/2000 | Boutaghou | 6,629,906 | B1 | 10/2003 | Chiba et al. |
| 6,165,616 | A | 12/2000 | Lemelson et al. | 6,637,528 | B2 | 10/2003 | Nishiyama et al. |
| 6,170,156 | B1 | 1/2001 | Lev et al. | 6,638,569 | B2 | 10/2003 | McLaughlin et al. |
| 6,171,343 | B1 | 1/2001 | Dearnaley et al. | 6,645,354 | B1 | 11/2003 | Gorokhovsky |
| 6,173,913 | B1 | 1/2001 | Shafer et al. | 6,656,329 | B1 | 12/2003 | Ma et al. |
| 6,190,514 | B1 | 2/2001 | Ma et al. | 6,658,941 | B1 | 12/2003 | Bills et al. |
| 6,193,906 | B1 | 2/2001 | Kaneko et al. | 6,666,328 | B2 | 12/2003 | Sykora |
| 6,197,120 | B1 | 3/2001 | David | 6,666,671 | B1 | 12/2003 | Olver et al. |
| 6,197,428 | B1 | 3/2001 | Rogers | 6,684,513 | B1 | 2/2004 | Clipstone et al. |
| 6,203,651 | B1 | 3/2001 | Jaervenkylae et al. | 6,684,759 | B1 | 2/2004 | Gorokhovsky |
| 6,205,291 | B1 | 3/2001 | Hughes et al. | 6,695,865 | B2 | 2/2004 | Boyle et al. |
| 6,207,625 | B1 | 3/2001 | Ogano et al. | 6,699,106 | B2 | 3/2004 | Myoung et al. |
| 6,227,056 | B1 | 5/2001 | Bills et al. | 6,701,627 | B2 | 3/2004 | Korb et al. |
| 6,237,441 | B1 | 5/2001 | Nishioka et al. | 6,715,693 | B1 | 4/2004 | Dam et al. |
| 6,237,852 | B1 | 5/2001 | Svetal et al. | 6,726,993 | B2 | 4/2004 | Teer et al. |
| 6,238,839 | B1 | 5/2001 | Tomita et al. | 6,729,350 | B2 | 5/2004 | Schick |
| 6,255,262 | B1 | 7/2001 | Keenan et al. | 6,729,527 | B2 | 5/2004 | Sonnenreich et al. |
| 6,261,424 | B1 | 7/2001 | Goncharenko et al. | 6,733,513 | B2 | 5/2004 | Boyle et al. |
| 6,273,793 | B1 | 8/2001 | Liners et al. | 6,739,214 | B2 | 5/2004 | Griffin et al. |
| 6,274,220 | B1 | 8/2001 | Tsukuda et al. | 6,739,238 | B2 | 5/2004 | Ushijima et al. |
| 6,289,593 | B1 | 9/2001 | Decker et al. | 6,740,393 | B1 | 5/2004 | Massler et al. |
| 6,293,648 | B1 | 9/2001 | Anderson | 6,745,742 | B2 | 6/2004 | Meyer |
| 6,296,552 | B1 | 10/2001 | Boutaghou et al. | 6,749,033 | B2 | 6/2004 | Griffin et al. |
| 6,299,425 | B1 | 10/2001 | Hirano et al. | 6,753,042 | B1 | 6/2004 | Bakounine et al. |
| 6,305,416 | B1 | 10/2001 | Snel et al. | 6,753,635 | B2 | 6/2004 | Kuhlmann-Wilsdorf |
| 6,309,283 | B1 | 10/2001 | Liners et al. | 6,761,532 | B2 | 7/2004 | Capone et al. |
| 6,311,524 | B1 | 11/2001 | Brennan, III et al. | 6,761,736 | B1 | 7/2004 | Woo et al. |
| 6,316,734 | B1 | 11/2001 | Yang | 6,780,177 | B2 | 8/2004 | Shafirstein et al. |
| 6,322,431 | B1 | 11/2001 | Schaenzer et al. | 6,797,326 | B2 | 9/2004 | Griffin et al. |
| 6,322,719 | B2 | 11/2001 | Kaneko et al. | 6,799,468 | B2 | 10/2004 | Borenstein |
| 6,324,060 | B1 | 11/2001 | Hsu | 6,806,242 | B2 | 10/2004 | Shirahama et al. |
| 6,325,385 | B1 | 12/2001 | Iwashita et al. | 6,818,029 | B2 | 11/2004 | Myoung et al. |
| 6,329,328 | B1 | 12/2001 | Koganei et al. | 6,820,676 | B2 | 11/2004 | Palmaz et al. |
| 6,333,298 | B1 | 12/2001 | Waddoups et al. | 6,821,189 | B1 | 11/2004 | Coad et al. |
| 6,338,881 | B1 | 1/2002 | Sellschopp et al. | 6,821,624 | B2 | 11/2004 | Utsumi et al. |
| 6,340,245 | B1 | 1/2002 | Horton et al. | 6,822,788 | B2 | 11/2004 | Blitstein |
| 6,358,123 | B1 | 3/2002 | Liners et al. | 6,844,068 | B1 | 1/2005 | Miyake et al. |
| 6,367,705 | B1 | 4/2002 | Lee et al. | 6,849,085 | B2 | 2/2005 | Marton |
| 6,368,676 | B1 | 4/2002 | Gaudreau et al. | 6,855,237 | B2 | 2/2005 | Kolpakov et al. |
| 6,377,422 | B1 | 4/2002 | Boutaghou et al. | 6,855,791 | B2 | 2/2005 | Van Doren et al. |
| 6,379,383 | B1 | 4/2002 | Palmaz et al. | 6,861,098 | B2 | 3/2005 | Griffin et al. |
| 6,385,987 | B2 | 5/2002 | Schlom et al. | 6,861,137 | B2 | 3/2005 | Griffin et al. |
| 6,386,468 | B1 | 5/2002 | Neuberger et al. | 6,865,952 | B2 | 3/2005 | Bills et al. |
| 6,399,215 | B1 | 6/2002 | Zhu et al. | 6,866,894 | B2 | 3/2005 | Trankiem et al. |
| 6,401,058 | B1 | 6/2002 | Akalin et al. | 6,871,700 | B2 | 3/2005 | Gorokhovsky |
| 6,439,845 | B1 | 8/2002 | Veres | 6,872,203 | B2 | 3/2005 | Shafirstein et al. |

| | | |
|---|---|---|
| 6,878,447 B2 | 4/2005 | Griffin et al. |
| 6,880,469 B2 | 4/2005 | Frost |
| 6,882,094 B2 | 4/2005 | Dimitrijevic et al. |
| 6,883,476 B1 | 4/2005 | Nohara et al. |
| 6,886,521 B2 | 5/2005 | Hamada et al. |
| 6,887,585 B2 | 5/2005 | Herbst-Dederichs |
| 6,890,700 B2 | 5/2005 | Tomita et al. |
| 6,893,720 B1 | 5/2005 | Nakahigashi et al. |
| 6,969,198 B2 | 11/2005 | Konishi et al. |
| 7,086,362 B2 | 8/2006 | Mabuchi et al. |
| 7,406,940 B2 * | 8/2008 | Nishimura et al. ........ 123/193.6 |
| 7,427,162 B2 * | 9/2008 | Kano et al. .............. 384/492 |
| 2001/0036800 A1 | 11/2001 | Liners et al. |
| 2002/0026899 A1 | 3/2002 | McLaughlin et al. |
| 2002/0031987 A1 | 3/2002 | Liners et al. |
| 2002/0034631 A1 | 3/2002 | Griffin et al. |
| 2002/0034632 A1 | 3/2002 | Griffin et al. |
| 2002/0051286 A1 | 5/2002 | Blitstein |
| 2002/0070357 A1 | 6/2002 | Kim et al. |
| 2002/0074168 A1 | 6/2002 | Matthias et al. |
| 2002/0089571 A1 | 7/2002 | Lee et al. |
| 2002/0090155 A1 | 7/2002 | Ushijima et al. |
| 2002/0090578 A1 | 7/2002 | Schaefera et al. |
| 2002/0130219 A1 | 9/2002 | Parseghian et al. |
| 2002/0148430 A1 | 10/2002 | Kano et al. |
| 2002/0155015 A1 | 10/2002 | Esumi et al. |
| 2002/0175476 A1 | 11/2002 | Chinou et al. |
| 2003/0012234 A1 | 1/2003 | Watson et al. |
| 2003/0019111 A1 | 1/2003 | Korb et al. |
| 2003/0019332 A1 | 1/2003 | Korb et al. |
| 2003/0021995 A1 | 1/2003 | Griffin et al. |
| 2003/0034182 A1 | 2/2003 | Griffin et al. |
| 2003/0035957 A1 | 2/2003 | Griffin et al. |
| 2003/0035958 A1 | 2/2003 | Griffin et al. |
| 2003/0036341 A1 | 2/2003 | Myoung et al. |
| 2003/0037640 A1 | 2/2003 | Griffin et al. |
| 2003/0069632 A1 | 4/2003 | De Scheerder et al. |
| 2003/0108777 A1 | 6/2003 | Gunsel et al. |
| 2003/0114094 A1 | 6/2003 | Myoung et al. |
| 2003/0128903 A1 | 7/2003 | Yasuda et al. |
| 2003/0159919 A1 | 8/2003 | Fairbairn et al. |
| 2003/0162672 A1 | 8/2003 | Shirahama et al. |
| 2003/0168323 A1 | 9/2003 | Frost |
| 2003/0180565 A1 | 9/2003 | Herbst-Dederichs |
| 2003/0199741 A1 | 10/2003 | Martinez |
| 2003/0234371 A1 | 12/2003 | Ziegler |
| 2003/0235691 A1 | 12/2003 | Griffin et al. |
| 2004/0003638 A1 | 1/2004 | Schaefer et al. |
| 2004/0008406 A1 | 1/2004 | Blitstein |
| 2004/0010068 A1 | 1/2004 | Doren et al. |
| 2004/0011900 A1 | 1/2004 | Gebhardt et al. |
| 2004/0027018 A1 | 2/2004 | LeBlanc et al. |
| 2004/0035375 A1 | 2/2004 | Gibisch et al. |
| 2004/0074467 A1 | 4/2004 | Hamada et al. |
| 2004/0092405 A1 | 5/2004 | Konishi et al. |
| 2004/0105806 A1 | 6/2004 | Griffin et al. |
| 2004/0109621 A1 | 6/2004 | Frost |
| 2004/0115435 A1 | 6/2004 | Griffin et al. |
| 2004/0116242 A1 | 6/2004 | Uchiyama et al. |
| 2004/0133301 A1 | 7/2004 | Van Doren et al. |
| 2004/0154570 A1 | 8/2004 | Mabuchi et al. |
| 2004/0168326 A1 | 9/2004 | Korb et al. |
| 2004/0184687 A1 | 9/2004 | Morales et al. |
| 2004/0223256 A1 | 11/2004 | Feng et al. |
| 2004/0234770 A1 | 11/2004 | Mori et al. |
| 2004/0241448 A1 | 12/2004 | Kano et al. |
| 2004/0242435 A1 | 12/2004 | Nishimura et al. |
| 2004/0244539 A1 | 12/2004 | Korb et al. |
| 2004/0261614 A1 | 12/2004 | Hamada et al. |
| 2005/0001201 A1 | 1/2005 | Bocko et al. |
| 2005/0005892 A1 | 1/2005 | Nishimura et al. |
| 2005/0025975 A1 | 2/2005 | Okamoto et al. |
| 2005/0035222 A1 | 2/2005 | Hamada et al. |
| 2005/0037879 A1 | 2/2005 | Murata et al. |
| 2005/0056241 A1 | 3/2005 | Nomura et al. |
| 2005/0061291 A1 | 3/2005 | Nishimura et al. |
| 2005/0061636 A1 | 3/2005 | Frost et al. |
| 2005/0064196 A1 | 3/2005 | Martin et al. |
| 2005/0082139 A1 | 4/2005 | Ishikawa et al. |
| 2005/0084390 A1 | 4/2005 | Ueno et al. |
| 2005/0089685 A1 | 4/2005 | Hamada et al. |
| 2005/0098134 A1 | 5/2005 | Nishimura et al. |
| 2005/0100701 A1 | 5/2005 | Hamada et al. |
| 2005/0115744 A1 | 6/2005 | Griffin et al. |
| 2005/0188942 A1 | 9/2005 | Hamada et al. |
| 2006/0093839 A1 | 5/2006 | Okamoto et al. |
| 2006/0207540 A1 | 9/2006 | Matsui et al. |
| 2006/0263604 A1 | 11/2006 | Martin et al. |
| 2007/0060483 A1 | 3/2007 | Konishi et al. |

FOREIGN PATENT DOCUMENTS

| | | |
|---|---|---|
| DE | 6 43 034 | 3/1937 |
| DE | 195 07 086 A1 | 9/1996 |
| DE | 195 07 086 C2 | 9/1996 |
| DE | 197 04 224 A1 | 8/1997 |
| DE | 198 25 860 A1 | 12/1999 |
| DE | 100 17 459 A1 | 10/2000 |
| DE | 100 61 397 A1 | 5/2002 |
| DE | 101 58 683 A1 | 6/2003 |
| DE | 103 18 135 A1 | 11/2003 |
| DE | 103 37 559 A1 | 3/2005 |
| EP | 0 286 996 A3 | 10/1988 |
| EP | 0 299 785 A2 | 1/1989 |
| EP | 0 308 143 A1 | 3/1989 |
| EP | 0 333 416 A1 | 9/1989 |
| EP | 0 384 772 A1 | 8/1990 |
| EP | 0 388 800 A2 | 9/1990 |
| EP | 0 391 125 B1 | 10/1990 |
| EP | 0 392 125 A1 | 10/1990 |
| EP | 0 398 985 B1 | 11/1990 |
| EP | 0 407 977 A1 | 1/1991 |
| EP | 0 435 312 A1 | 7/1991 |
| EP | 0 291 006 B1 | 1/1992 |
| EP | 0 474 369 A1 | 3/1992 |
| EP | 0 500 253 A1 | 8/1992 |
| EP | 0 511 153 A1 | 10/1992 |
| EP | 0 529 327 A1 | 3/1993 |
| EP | 0 546 824 A1 | 6/1993 |
| EP | 0 308 143 B1 | 11/1993 |
| EP | 0 573 943 A1 | 12/1993 |
| EP | 0 619 504 A1 | 10/1994 |
| EP | 0 621 136 A2 | 10/1994 |
| EP | 0 624 353 A3 | 11/1994 |
| EP | 0 624 354 A1 | 11/1994 |
| EP | 0 378 378 B1 | 1/1995 |
| EP | 0 651 069 A1 | 5/1995 |
| EP | 0 651 069 B1 | 5/1995 |
| EP | 0 652 301 A1 | 5/1995 |
| EP | 0 656 458 A3 | 6/1995 |
| EP | 0 661 470 A2 | 7/1995 |
| EP | 0 652 301 B1 | 10/1995 |
| EP | 0 396 603 B1 | 6/1996 |
| EP | 0 388 800 B1 | 12/1996 |
| EP | 0 757 615 B1 | 2/1997 |
| EP | 0 759 519 A2 | 2/1997 |
| EP | 0 474 369 B1 | 3/1997 |
| EP | 0 818 622 A1 | 1/1998 |
| EP | 0 826 790 A1 | 3/1998 |
| EP | 0 826 790 B1 | 3/1998 |
| EP | 0 842 754 A1 | 5/1998 |
| EP | 0 850 133 B1 | 7/1998 |
| EP | 0 816 112 A3 | 10/1998 |
| EP | 0 870 820 A1 | 10/1998 |
| EP | 0 882 759 A1 | 12/1998 |
| EP | 0 624 353 B1 | 2/1999 |

| | | | | | | |
|---|---|---|---|---|---|---|
| EP | 0 656 458 B1 | 2/1999 | | JP | 09-253770 A | 9/1997 |
| EP | 0 647 318 B1 | 3/1999 | | JP | 10-088369 A | 4/1998 |
| EP | 0 905 221 | 3/1999 | | JP | 10-265790 A | 10/1998 |
| EP | 0 905 419 A2 | 3/1999 | | JP | 10-298440 A | 11/1998 |
| EP | 0 731 190 B1 | 5/1999 | | JP | 11-022423 A | 1/1999 |
| EP | 0 949 200 A1 | 10/1999 | | JP | 11-190406 A | 7/1999 |
| EP | 0 950 123 B1 | 10/1999 | | JP | 11-287329 A | 10/1999 |
| EP | 0 845 154 B1 | 11/1999 | | JP | 11-292629 A | 10/1999 |
| EP | 0 624 354 B1 | 12/1999 | | JP | 11-294118 A | 10/1999 |
| EP | 0 582 676 B1 | 3/2000 | | JP | 11-333773 A | 12/1999 |
| EP | 1 063 085 A1 | 12/2000 | | JP | 2000-088104 A | 3/2000 |
| EP | 0 850 126 B1 | 1/2001 | | JP | 2000-119843 A | 4/2000 |
| EP | 1 067 211 A1 | 1/2001 | | JP | 2000-504089 A | 4/2000 |
| EP | 1 076 087 A1 | 2/2001 | | JP | 2000-170768 A | 6/2000 |
| EP | 1 078 736 A1 | 2/2001 | | JP | 2000-297373 A | 10/2000 |
| EP | 1 109 196 A1 | 6/2001 | | JP | 2000-327484 A | 11/2000 |
| EP | 0 778 902 B1 | 9/2001 | | JP | 2000-339083 A | 12/2000 |
| EP | 1 154 012 A2 | 11/2001 | | JP | 2001-062605 A | 3/2001 |
| EP | 1 034 320 B1 | 12/2001 | | JP | 2001-064005 A | 3/2001 |
| EP | 0 893 677 B1 | 1/2002 | | JP | 2001-093141 A | 4/2001 |
| EP | 1 183 470 B1 | 3/2002 | | JP | 2001-172766 A | 6/2001 |
| EP | 1 184 480 A2 | 3/2002 | | JP | 2001-192864 A | 7/2001 |
| EP | 1 190 791 A3 | 4/2002 | | JP | 2001-269938 A | 10/2001 |
| EP | 1 219 464 A2 | 7/2002 | | JP | 2001-280236 A | 10/2001 |
| EP | 1 233 054 A1 | 8/2002 | | JP | 2002-265968 A | 9/2002 |
| EP | 0 971 812 B1 | 10/2002 | | JP | 2002-309912 A | 10/2002 |
| EP | 1 018 291 B1 | 10/2002 | | JP | 2002-332571 A | 11/2002 |
| EP | 1 281 513 A2 | 2/2003 | | JP | 2003-013163 A | 1/2003 |
| EP | 1 300 608 A2 | 4/2003 | | JP | 2003-013799 A | 1/2003 |
| EP | 0 882 759 B1 | 6/2003 | | JP | 2003-025117 A | 1/2003 |
| EP | 1 498 597 A1 | 7/2003 | | JP | 2003-028174 A | 1/2003 |
| EP | 1 340 605 A1 | 9/2003 | | JP | 2003-088939 A | 3/2003 |
| EP | 1 365 141 A1 | 11/2003 | | JP | 2003-113941 A | 4/2003 |
| EP | 1 083 946 B1 | 12/2003 | | JP | 2003-147508 A | 5/2003 |
| EP | 1 078 736 B1 | 1/2004 | | JP | 2004-036788 A | 2/2004 |
| EP | 1 378 271 A1 | 1/2004 | | JP | 2004-155891 A | 6/2004 |
| EP | 0 842 754 B1 | 3/2004 | | JP | 2005-068529 A | 3/2005 |
| EP | 0 862 395 B1 | 4/2004 | | RU | 1770350 A1 | 10/1992 |
| EP | 1 411 145 A1 | 4/2004 | | RU | 2004586 C1 | 12/1993 |
| EP | 1 418 353 A2 | 5/2004 | | RU | 2153782 C1 | 7/2000 |
| EP | 1 440 775 A1 | 7/2004 | | WO | WO-89/06338 A1 | 7/1989 |
| EP | 1 445 119 A1 | 8/2004 | | WO | WO-89/06707 A1 | 7/1989 |
| EP | 1 475 557 A1 | 11/2004 | | WO | WO-89/06708 A1 | 7/1989 |
| EP | 1 481 699 A1 | 12/2004 | | WO | WO-92/02602 A1 | 2/1992 |
| EP | 1 482 190 A2 | 12/2004 | | WO | WO-92/06843 A1 | 4/1992 |
| EP | 1 311 885 B1 | 3/2005 | | WO | WO-92/19425 A2 | 11/1992 |
| EP | 1 510 594 A2 | 3/2005 | | WO | WO-93/21288 A1 | 10/1993 |
| EP | 1 512 781 A2 | 3/2005 | | WO | WO-93/21289 A1 | 10/1993 |
| EP | 1 338 641 B1 | 5/2006 | | WO | WO-93/24828 A1 | 12/1993 |
| FR | 2669689 A1 | 5/1992 | | WO | WO-95/20253 A2 | 7/1995 |
| GB | 0 768 226 | 2/1957 | | WO | WO-95/29044 A1 | 11/1995 |
| GB | 1 005 638 | 9/1965 | | WO | WO-95/29273 A1 | 11/1995 |
| GB | 2 338 716 A | 12/1999 | | WO | WO-95/31584 A1 | 11/1995 |
| IE | 990532 A1 | 3/2001 | | WO | WO-96/04485 A1 | 2/1996 |
| JP | 52-006318 | 1/1977 | | WO | WO-96/05333 A1 | 2/1996 |
| JP | 62-111106 A | 5/1987 | | WO | WO-96/05942 A1 | 2/1996 |
| JP | 63-021209 A | 1/1988 | | WO | WO-96/06961 A1 | 3/1996 |
| JP | 63-288994 A | 11/1988 | | WO | WO-96/12389 A1 | 4/1996 |
| JP | 05-070879 A | 3/1993 | | WO | WO-96/24488 A1 | 8/1996 |
| JP | 05-036004 U | 5/1993 | | WO | WO-96/40446 A1 | 12/1996 |
| JP | 05-042616 U | 6/1993 | | WO | WO-97/07531 A1 | 2/1997 |
| JP | 06-264993 A | 9/1994 | | WO | WO-97/10093 A1 | 3/1997 |
| JP | 06-294307 A | 10/1994 | | WO | WO-97/10940 A1 | 3/1997 |
| JP | 07-063135 A | 3/1995 | | WO | WO-97/14555 A1 | 4/1997 |
| JP | 07-090553 A | 4/1995 | | WO | WO-97/16138 A1 | 5/1997 |
| JP | 07-103238 A | 4/1995 | | WO | WO-98/02715 A1 | 1/1998 |
| JP | 07-118832 A | 5/1995 | | WO | WO-98/12994 A1 | 4/1998 |
| JP | 07-041386 A | 10/1995 | | WO | WO-98/13528 A1 | 4/1998 |
| JP | 07-286696 A | 10/1995 | | WO | WO-98/47141 A1 | 10/1998 |
| JP | 08-014014 A | 1/1996 | | WO | WO-99/09547 A1 | 2/1999 |
| JP | 08-061499 A | 3/1996 | | WO | WO-99/12404 A1 | 3/1999 |
| JP | 08-128448 A | 5/1996 | | WO | WO-99/14512 A1 | 3/1999 |
| JP | 09-020981 A | 1/1997 | | WO | WO-99/16371 A1 | 4/1999 |

| | | | |
|---|---|---|---|
| WO | WO-99/22694 A2 | 5/1999 |
| WO | WO-99/27157 A1 | 6/1999 |
| WO | WO-99/29477 A1 | 6/1999 |
| WO | WO-99/31557 A1 | 6/1999 |
| WO | WO-99/34385 A1 | 7/1999 |
| WO | WO-99/46847 A1 | 9/1999 |
| WO | WO-99/54520 A1 | 10/1999 |
| WO | WO-99/54934 A1 | 10/1999 |
| WO | WO-99/57743 A1 | 11/1999 |
| WO | WO-99/62077 A1 | 12/1999 |
| WO | WO-99/62572 A1 | 12/1999 |
| WO | WO-00/22613 A1 | 4/2000 |
| WO | WO-00/24554 A1 | 5/2000 |
| WO | WO-00/25410 A1 | 5/2000 |
| WO | WO-00/28142 A1 | 5/2000 |
| WO | WO-00/33051 A1 | 6/2000 |
| WO | WO-00/35000 A1 | 6/2000 |
| WO | WO-00/44032 A1 | 7/2000 |
| WO | WO-00/47402 A1 | 8/2000 |
| WO | WO-00/55385 A1 | 9/2000 |
| WO | WO-00/56127 A1 | 9/2000 |
| WO | WO-00/56393 A1 | 9/2000 |
| WO | WO-00/62327 A2 | 10/2000 |
| WO | WO-00/68451 A2 | 11/2000 |
| WO | WO-00/75517 A1 | 12/2000 |
| WO | WO-00/78504 A1 | 12/2000 |
| WO | WO-01/05917 A1 | 1/2001 |
| WO | WO-01/06033 A1 | 1/2001 |
| WO | WO-01/14736 A1 | 3/2001 |
| WO | WO-01/14745 A1 | 3/2001 |
| WO | WO-01/26862 A1 | 4/2001 |
| WO | WO-01/37631 A2 | 5/2001 |
| WO | WO-01/40537 A1 | 6/2001 |
| WO | WO-01/47451 A1 | 7/2001 |
| WO | WO-01/59544 A2 | 8/2001 |
| WO | WO-01/61182 A1 | 8/2001 |
| WO | WO-01/61719 A1 | 8/2001 |
| WO | WO-01/62372 A1 | 8/2001 |
| WO | WO-01/63639 A1 | 8/2001 |
| WO | WO-01/67834 A1 | 9/2001 |
| WO | WO-01/79583 A2 | 10/2001 |
| WO | WO-01/80224 A2 | 10/2001 |
| WO | WO-02/06875 A1 | 1/2002 |
| WO | WO-02/13188 A1 | 2/2002 |
| WO | WO-02/24601 A1 | 3/2002 |
| WO | WO-02/24603 A1 | 3/2002 |
| WO | WO-02/24970 A2 | 3/2002 |
| WO | WO-02/32625 A2 | 4/2002 |
| WO | WO-02/44440 A1 | 6/2002 |
| WO | WO-02/054454 A2 | 7/2002 |
| WO | WO-02/062714 A2 | 8/2002 |
| WO | WO-02/073021 A1 | 9/2002 |
| WO | WO-02/080996 A1 | 10/2002 |
| WO | WO-02/085237 A2 | 10/2002 |
| WO | WO-02/090461 A1 | 11/2002 |
| WO | WO-02/097289 A1 | 12/2002 |
| WO | WO-03/009978 A1 | 2/2003 |
| WO | WO-03/013990 A1 | 2/2003 |
| WO | WO-03/020329 A1 | 3/2003 |
| WO | WO-03/021731 A1 | 3/2003 |
| WO | WO-03/029685 A1 | 4/2003 |
| WO | WO-03/031543 A2 | 4/2003 |
| WO | WO-03/046508 A3 | 6/2003 |
| WO | WO-03/054876 A1 | 7/2003 |
| WO | WO-03/076309 A1 | 9/2003 |
| WO | WO-03/078679 A1 | 9/2003 |
| WO | WO-03/091758 A2 | 11/2003 |
| WO | WO-03/095009 A1 | 11/2003 |
| WO | WO-03/105134 A1 | 12/2003 |
| WO | WO-04/001804 A2 | 12/2003 |
| WO | WO-2004/004998 A1 | 1/2004 |
| WO | WO-2004/019809 A2 | 3/2004 |
| WO | WO-2004/024206 A1 | 3/2004 |
| WO | WO-2004/026359 A1 | 4/2004 |
| WO | WO-2004/026500 A2 | 4/2004 |
| WO | WO-2004/036169 A1 | 4/2004 |
| WO | WO-2004/036292 A2 | 4/2004 |
| WO | WO-2004/038701 A2 | 5/2004 |
| WO | WO-2004/043631 A1 | 5/2004 |
| WO | WO-2004/048126 A2 | 6/2004 |
| WO | WO-2004/067466 A1 | 8/2004 |
| WO | WO-2004/068530 A1 | 8/2004 |
| WO | WO-2004/071670 A1 | 8/2004 |
| WO | WO-2004/072959 A2 | 8/2004 |
| WO | WO-2004/078424 A2 | 9/2004 |
| WO | WO-2004/084773 A1 | 10/2004 |
| WO | WO-2004/088113 A1 | 10/2004 |
| WO | WO-2005/010596 A2 | 2/2005 |
| WO | WO-2005/011744 A2 | 2/2005 |
| WO | WO-2005/014760 A1 | 2/2005 |
| WO | WO-2005/014761 A2 | 2/2005 |
| WO | WO-2005/014763 A1 | 2/2005 |
| WO | WO-2005/014882 A1 | 2/2005 |
| WO | WO-2005/016620 A2 | 2/2005 |
| WO | WO-2005/021851 A1 | 3/2005 |
| WO | WO-2005/025844 A1 | 3/2005 |
| WO | WO-2005/034791 A1 | 4/2005 |
| WO | WO-2005/037144 A2 | 4/2005 |
| WO | WO-2005/037985 A2 | 4/2005 |
| WO | WO-2005/040451 A1 | 5/2005 |
| WO | WO-2005/042064 A1 | 5/2005 |
| WO | WO-2005/047737 A1 | 5/2005 |
| WO | WO-2006/075219 A2 | 7/2006 |

OTHER PUBLICATIONS

U.S. Appl. No. 10/468,713, filed Aug. 22, 2003, Mabuchi et al.
U.S. Appl. No. 10/911,741, filed May 5, 2004, Ueno.
"Aluminium Alloy Die Castings," Japanese Industrial Standard (JIS H 5302), 2000, pp. 1-12.
"Aluminium Alloy Die Castings," JIS H5302, (2000), pp. 1670-1681.
"Aluminium Alloys Castings", Japanese Industrial Standard (JIS H 5202), 1999 (18 pages).
"Assessment of 2nd to 5th Order Irregularities of Surface Configuration by Means of Sections of Surfaces Definitions Relating to Reference System and Dimensions," DIN 4762, UDC 621-288:001.4 (Aug. 1960), pp. 1-4.
"Carbon Steels for Machine Structural Use", Japanese Industrial Standard (JIS G 4051), 1979, pp. 1-10.
"Carbon Steels for Machine Structural Use", Japanese Industrial Standard (JIS G 4051), 1979, pp. 1381-1383.
"Chromium Molybdenum Steels," Japanese Industrial Standard (JIS G 4105), 1979, pp. 1-11.
"Chromium Steels", Japanese Industrial Standard (JIS G 4104), 1979, pp. 1-9.
"Geometrical Product Specifications (GPS)—Surface texture: Profile method—Terms, definitions and surface texture parameters", Japanese Industrial Standard (JIS B 0601) Machine Elements, 2003, pp. 6, 7, 263-287, and 2586.
"Geometrical Product Specifications (GPS)—Surface Texture: Profile Method—Terms, Definitions and Surface Texture Parameters," International Standard, ISO 4287, TC 213 (1997), pp. 1-25.
"Grey iron castings", Japanese Industrial Standard (JIS G 5501), pp. 2075-2077.
"Stainless Steel Bars", Japanese Industrial Standard (JIS G 4303), pp. 1457-1477.
"Standard Practice for Codification of Certain Nonferrous Metals and Alloys, Cast and Wrought1", ASTM International, Designation: B 275-02, Jun. 2002, pp. 1-7.
"Standard Test Method for Calibration and Operation of the Falex Block-on-Ring Friction and Wear Testing Machine", ASTM Designation: D2714-88, Jan. 1989, pp. 383-386.
"Standard Test Method for Separation of Representative Aromatics and Nonaromatics Fractions of High-Boiling Oils by Elution Chromatography", ASTM Standards, Designation: D 2549-91 (Reapproved 1995), pp. 895-900.

Ajayi, O., et al., "Effect of Carbon Coating on Scuffing Performance in Diesel Fuels," Tribology Transactions, vol. 44, 2001, pp. 298-304.

Ajayi, O., et al., Effect of Thin-Film Coating on Wear in EGR-Contaminated Oil, Energy Technology Div., Argonne National Laboratory.

API Motor Oil Guide, Which Oil is Right for You, American Petroleum Institute, Copyright 2002.

D.G. Watson et al., "Engineering Drawing Practice," XP002281300, University of Hertfordshire, Sep. 1991, p. 29, Figure 38.

Dr. Marx, "Surfaces and Contact Mechanics", XP-002233233, Google, Retrieved from the Internet, Mar. 3, 2003, pp. 1-18.

E. Mayer-Rässler, "Neuartige Laufflächen-Schutzverfahren für Kolben von Verbrennungsmotoren", VDI-Zeitschrift Bd., Apr. 18, 1942, vol. 86, No. 15-16, pp. 245-247.

Engine Oil Viscosity Classification—SAE J300 revised Apr. 1997, p. 133.

Fujimori, N., et al., "Characterization of Conducting Diamond Films," Vacuum, vol. 36, Nos. 1-3, 1996, pp. 99-102.

Gåhlin, Rickard et al., "ME-C:H Coatings in Motor Vehicles," WEAR 249, 2001, pp. 302-309.

Hershberger, J, et al., "Friction and Wear Behavior of Near-Frictionless Carbon Coatings in Formulated Gasolines," Surface & Coating Technology, 183, 2004, pp. 111-117.

Hershberger, J., et al., "Evaluation of DLC Coatings for Spark-Ignited, Direct-Injected Fuel Systems," Surface & Coatings Technology, 179, 2004, pp. 237-244.

International Standard "Application of Carbides for Machining by Chip Removal—Designation of the Main Groups of Chip Removal and Groups of Application," ISO 513, (1975), pp. 67-69.

International Standard, "Petroleum products—Determination of base number—Perchloric acid potentiometric titration method", ISO 3771, second edition Aug. 15, 1994, pp. 1-8.

Japanese Industrial Standard "Aluminium Alloy Castings," JIS H5202, (1999), pp. 1-16.

Japanese Industrial Standard "Carbon Steels for Machine Structural Use," JIS G 4051, (1979), pp. 1-10.

Japanese Industrial Standard Handbook, "Machine Elements", 2003, pp. 262-286 and 2586.

Japanese Industrial Standard, "Aluminium Alloy Castings", JIS H 5202, 1999, pp. 1-17.

Japanese Industrial Standard, "Aluminium Alloy Castings", JIS H 5202, 1999, pp. 1910, 1911 and 1636-1647.

Japanese Industrial Standard, "Chromium Molybdenum Steels", JIS G 4105, 1978, pp. 1-11.

Japanese Industrial Standard, "Geometrical Product Specificatons (GPS)—Surface texture: Profile method—Terms, Definitions and surface texture parameters," No. B 0601 (2001), pp. 1-35.

Japanese Industrial Standard, "High Carbon Chromium Bearing Steels", JIS G 4805, 1999, pp. 1-31.

Japanese Industrial Standard, "Structural Steels with Specified Hardenability Bands", JIS G 4052, 1979, pp. 2414, 2415, 1390-1403, 1410 and 1411.

JIS Handbook, Machine Elements, "Geometrical Product Specifications (GPS)—Surface texture: Profile method—Terms, definitions and surface texture parameters", JIS B 0601, 2003, pp. 6, 7, 262-287 and 2586.

JIS Japanese Industrial Standard; "Surface Roughness—Definitions and Designation"; JIS B 0601; 1994. (w/Translation).

JIS Japanese Industrial Standard; "Vickers Hardness Test—Test Method"; JIS Z 2244; 1998; (w/Translation).

K. Holmberg et al., "Tribological Characteristics of Diamond-like Carbon Coatings," VTT Symposium, Technical Research Centre of Finland, XP000570636, 1994, pp. 24-238.

Kano et al., "Friction Characteristics of a Hard Carbon Film in Engine Oil, (No. 2) (Surface Analysis Result of Sliding Surface)," Japan Tribology Congress 1999, 5, pp. 11-12.

Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Kano et al., Japan Tribology Congress 1999, Proceeding pp. 11-12.

Kovalchenko, A., et al., "Friction and Wear Performance of Low-Friction Carbon Coatings Under Oil Lubrication," Energy Technology Div., Argonne National Laboratory.

M. Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Meyer-Rässler, "Neuartige Laufflächen-Schutzverfahren für Kolben von Verbrennungsmotoren," VDI-Zeitschrift, 1942, vol. 86, No. 15/16, pp. 245 to 247.

Patent/Literature Search Report, Bawa Biotechnology Consulting, LLC, Jun. 3, 2005 (201 pages).

Ronkainen, Helena, "Tribological Properties of Hydrogenated and Hydrogen-Free Diamond-Like Carbon Coatings," Dissertation for the Degree of Doctor of Science in Technology, VTT Publications No. 434.

Steve J. Bull et al., "High-Performance Diamond and Diamond-like Coatings", JOM, Apr. 1995, pp. 16-19, vol. 47, No. 4, XP000500980.

* cited by examiner

LOW-FRICTION SLIDING MEMBER IN TRANSMISSION, AND TRANSMISSION OIL THEREFOR

CROSS-REFERENCE TO RELATED APPLICATIONS

The present application is a continuation based upon U.S. patent application Ser. No. 10/921,291, filed Aug. 19, 2004, which claims priority from Japanese Patent Applications No. P2003-208366, filed Aug. 22, 2003, No. P2003-208368, filed Aug. 22, 2003, No. P2004-230038, filed Aug. 6, 2004 and No. P2004-230039, filed Aug. 6, 2004, the entire contents of which are incorporated herein by reference, and which has the following related applications: U.S. patent application Ser. No. 09/545,181, filed on Apr. 7, 2000, now U.S. Pat. No. 6,844,068, which is based on Japanese Patent Application No. Hei-11-102205 filed Apr. 9, 1999; Ser. No. 10/468,713, filed on Sep. 27, 2002, now U.S. Pat. No. 7,086,362, which is the national stage (United States) application of PCT Application JP02/10057, based on Japanese Patent Application No. 2001-117680, filed Apr. 17, 2001; Ser. No. 10/355,099, filed Jan. 31, 2003, now U.S. Pat. No. 6,806,242, which is based on Japanese Patent Application No. 2002-45576, filed Feb. 22, 2002; Ser. No. 10/682,559, filed Oct. 10, 2003, now U.S. Pat. No. 6,886,521, which is based on Japanese Patent Application No. 2002-302205 filed Oct. 16, 2002; and Ser. No. 10/692,853, filed on Oct. 27, 2003, now U.S. Pat. No. 6,969,198, which is based on Japanese Patent Application No. 2002-322322 filed Oct. 16, 2002.

BACKGROUND OF THE INVENTION

This invention relates to improvements in a low-friction sliding member in a transmission, and more particularly to the low-friction sliding member suitable to be used in a continuously variable transmission and in an automatic transmission and a transmission oil composition used for the low-friction sliding member.

Global environmental problems such as global warming and ozone layer destruction are coming to the fore. As it has been said that the global warming is significantly affected by $CO_2$ emission, the reduction of $CO_2$ emission, notably the setting of $CO_2$ emission standards, has become a big concern to each country. One of challenges to reduce $CO_2$ emission is to improve a fuel efficiency or fuel economy that depends on the performance of sliding members and a lubricating oil applied thereto. It will be understood that the sliding members and the lubricating oil perform great roles for improving the fuel economy.

The sliding members have been required to be excellent in wear resistance even in a sliding site where a frictional wear circumstance is severe as compared with other sliding sites in the transmission. Recently, application of a variety of hard thin films has been in progress. In general, hard carbon thin films have been expected as low-friction materials for the sliding members because they have low friction coefficients in air and in presence of lubricating oil as compared with wear-resistant hard coating materials such as titanium nitride (TiN) or chromium nitride (CrN).

Additionally, there are the following approaches to improve the fuel economy in connection with the lubricating oil: (1) lowering the viscosity of the lubricating oil, thereby reducing viscous resistance in hydrodynamic lubrication regions and agitation resistance in the engine; and (2) adding a suitable friction modifier and other additives into the lubricating oil so as to reduce friction losses under the conditions of mixed lubrication and boundary lubrication.

Such approaches concerning frictional characteristics in connection with the lubricating oil are discussed in Japan Tribology Congress 1999. 5, Tokyo, Proceeding Page 11-12, KANO et al and in World Tribology Congress 2001. 9, Vienna, Proceeding Page 342, KANO et al.

SUMMARY OF THE INVENTION

However, it has also been revealed that general hard carbon thin films excellent in low frictional characteristics in air are not necessarily high in friction reduction effect in presence of a lubricating oil, and that such hard carbon thin films cannot sufficiently exhibit the friction reduction effect even if a lubricating oil (composition) containing known an organomolybdenum compound is applied for the general hard carbon thin films.

It is, therefore, an object of the present invention to provide an improved low-friction sliding member in a transmission and an improved transmission oil composition therefor, by which drawbacks encountered in conventional techniques can be effectively overcome.

Another object of the present invention is to provide an improved low-friction sliding member in a transmission and an improved transmission oil composition therefor, by which the sliding member has an extremely excellent low frictional characteristics and is excellent in wear resistance while stably exhibiting the low frictional characteristics for a long time.

An aspect of the present invention resides in a low-friction sliding member in a transmission which sliding member is at least one of sliding members which are in slidable contact with each other in presence of a transmission oil composition. The low-friction sliding member comprises a base material having a sliding section. A hard carbon thin film is coated at a sliding surface of the sliding section of the base material. The hard carbon thin film contains hydrogen in an amount not more than 20 atomic %. Here, the transmission oil composition contains at least one of organic oxygen-containing compound and aliphatic amine compound.

Another aspect of the present invention resides in a transmission oil composition used for a low-friction sliding member in a transmission which sliding member is at least one of sliding members which are in slidable contact with each other in presence of the transmission oil composition. The low-friction sliding member includes a base material having a sliding section, and a hard carbon thin film coated at a sliding surface of the sliding section of the base material. The hard carbon thin film contains hydrogen in an amount not more than 20 atomic %. The transmission oil composition comprises at least one of organic oxygen-containing compound and aliphatic amine compound.

DETAILED DESCRIPTION OF THE INVENTION

The present invention is discussed below in detail. In the following description, all percentages (%) are by mass unless otherwise specified.

First Embodiment

A first embodiment of a low-friction sliding member in a transmission, according to the present invention will be discussed.

Figure 1:
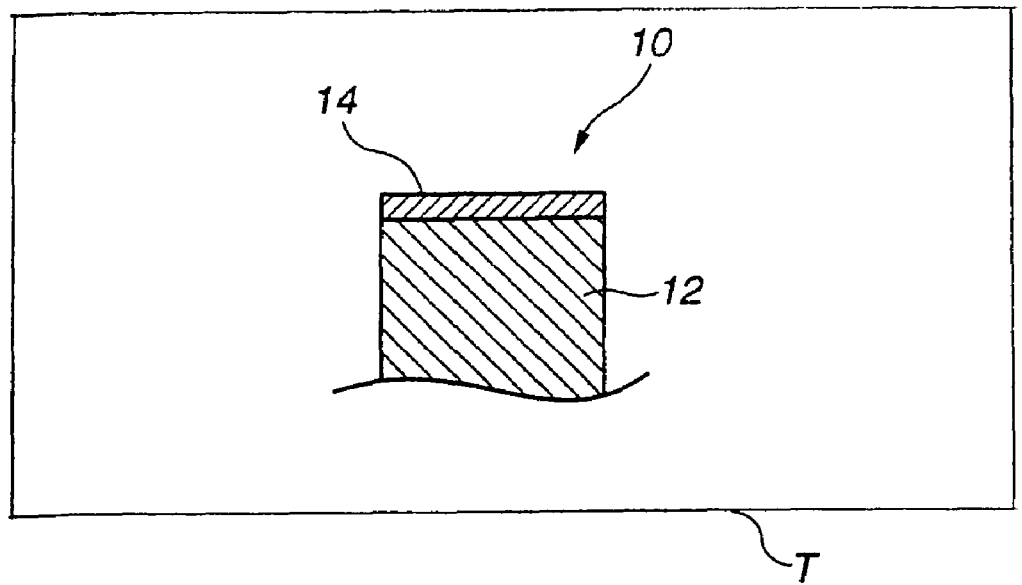
FIG. 1 is a fragmentary sectional view of a tooth of a gear used in a continuously variable transmission, as an embodiment of a low-friction sliding member according to the present invention.

A low-friction sliding member in a continuously variable transmission (CVT) is at least one of sliding members which are in slidable contact with each other in presence of a continuously variable transmission oil or fluid (composition) which may be referred to as "CVTF (composition)". The low-friction sliding member includes a base material formed of, for example, a carburized SCM 420 steel. The SCM steel is according to JIS (Japanese Industrial Standard) G 4105. The base material has a sliding section whose sliding surface is coated with a hard carbon thin film. The continuously variable transmission oil (may be referred to as "lubricating oil") contains at least one of organic oxygen-containing compound and aliphatic amine compound as ashless friction modifier(s). By virtue of this continuously variable transmission oil, at least one of the sliding surfaces of the sliding members is coated with the hard carbon thin film, and therefore the sliding members can be in slidable contact with each other with an extremely low friction as compared with that in conventional techniques. Examples of the low-friction sliding member are gears, rotatable shafts, parts of bearings, and the like in the continuously variable transmission. FIG. 1 shows a part of a tooth 10 of a gear used in the continuously variable transmission T. The gear tooth 10 includes the base material 12 having the sliding surface which is coated with the hard carbon thin film 14.

The hard carbon thin film is formed of, for example, DLC (diamond-like carbon) material which is mainly constituted of carbon atom and amorphous. The DLC material takes a diamond structure ($SP^3$ bonding) and/or a graphite structure ($SP^2$ bonding) in bonding mode among carbons. More specifically, the hard carbon (DLC) thin film is formed of hydrogen-free amorphous carbon (a-C) that consists of carbon, hydrogen-containing amorphous carbon (a-C:H), or metal carbide or metal carbon (MeC) that contains as a part a metal element of titanium (Ti) or Molybdenum (Mo).

As a hydrogen content in the hard carbon thin film increases, the friction coefficient increases. Accordingly, in the present invention, it is necessary that the upper limit of the hydrogen content in the hard carbon thin film is 20 atomic %. In order to sufficiently lower the friction coefficient in the lubricating oil during sliding and to obtain a stable sliding characteristics, the hydrogen content in the hard carbon thin film is preferably not more than 10 atomic %, and more preferably not more than 0.5 atomic %.

The hard carbon thin film having such a low hydrogen content is obtained by a PVD or CVD process that substantially does not use hydrogen and/or hydrogen-containing compound, such as a sputtering process or an ion plating process. In this case, it is preferable to carry out a film-forming operation for the hard carbon thin film upon baking of a reactor and tools for supporting the base material and upon sufficiently cleaning the surface of the base material in order to reduce the hydrogen content in the hard carbon thin film, in addition to using gas containing no hydrogen during the film-forming operation.

The hard carbon thin film is formed on the surface of the base material. Since the film thickness of the hard carbon thin film is considerably small, the surface roughness of the base material in a condition before the hard carbon thin film is formed largely affects the surface roughness of the hard carbon thin film formed on the surface of the base material. Accordingly, the surface roughness (center line average roughness) Ra of the base material is preferably not larger than 0.1 µm in the condition where the base material has not yet been coated with the hard carbon thin film. If the surface roughness of the base material exceeds 0.1 µm, projecting portions due to the surface roughness of the hard carbon thin film increases a local Hertz's contact pressure to an opposite member, thereby resulting in induction of formation of crack in the hard carbon thin film. The surface roughness Ra is explained as $R_{a75}$ in JIS (Japanese Industrial Standard) B 0601 (:2001).

The hard carbon thin film preferably has a surface hardness or micro Vickers hardness (Hv) ranging from 1000 to 3500 as measured under application of a 10 g load and a thickness ranging from 0.3 to 2.0 µm. If the surface hardness and thickness of the hard carbon thin film are out of the above ranges, wear of the hard carbon thin film will occur in case that the surface hardness (Hv) is smaller than 1000 and the thickness is smaller than 0.3 µm, whereas peeling-off of the hard carbon thin film tends to occur in case that the surface hardness (Hv) exceeds 3500 and the thickness exceeds 2.0 µm.

The low-friction sliding member in the continuously variable transmission is particularly effective to be used as sliding members of a continuously variable transmission which sliding members have respective sliding surfaces which are in slidable contact with the sliding surfaces of the opposite members which are formed of an iron-based material or an aluminum alloy, in presence of the continuously variable transmission oil provided between the contactable sliding surfaces. The continuously variable transmission in the present invention means a transmission in which speed-changing operation is continuously made. A typical example of the continuously variable transmission has a mechanism in which fixed and movable pulley sheaves (constituting a pulley) are mounted on each of drive and driven shafts, a metallic belt being put between the pulley sheaves so that the metallic belt is passed on the both pulleys mounted on the drive and driven shafts. Accordingly, power from an engine is transmitted from the pulley on the drive shaft to the pulley on the driven shaft through the metallic belt thereby continuously making the speed-changing operation for the vehicle.

Next, the continuously variable transmission oil or lubricating oil used for the continuously variable transmission will be discussed.

The continuously variable transmission oil or lubricating oil (composition) preferably includes a base oil and at least one of the organic oxygen-containing compound and an aliphatic amine compound as ashless friction modifier. It is to be noted that an extremely excellent low friction characteristics can be exhibited in presence of the lubricating oil at the sliding surface coated with the hard carbon thin film.

The base oil is not particularly limited and can be any base oil (compound or compounds) commonly used for a lubricating oil, such as a mineral oil, a synthetic oil, an oil and fat (compound), or any combination of the mineral oil, the synthetic oil and the oil and fat.

Specific examples of the mineral oil include paraffin-based or naphthene-based oil, and n-paraffin, prepared by extracting a lubricating oil fraction from petroleum by atmospheric or reduced-pressure distillation, and then, purifying the obtained lubricating oil fraction by using at least one of the following treatments: solvent deasphalting, solvent extraction, hydrogenolysis, solvent dewaxing, hydrogenation purification, sulfuric acid treatment, clay treatment and the like which may be used in suitable combination. It is general to purify the obtained lubricating oil fraction by using hydrogenation purification or solvent purification. Additionally, it is preferable to use the mineral oil which is obtained by purifying the lubricating oil fraction using high-hydrogenolysis process which is capable of largely decreasing aromatic components, or the mineral oil produced by a process for isomerizing GTL (gas to liquid) Wax.

Specific examples of the synthetic oil include: poly-α-olefins (such as 1-octene oligomer, 1-decene oligomer and ethylene-propylene oligomer), hydrides of poly-α-olefins, isobutene oligomers, hydrides of isobutene oligomers, isoparaffins, alkylbenzenes, alkylnaphthalenes, diesters (such as ditridecyl glutarate, dioctyl adipate, diisodecyl adipate, ditridecyl adipate and dioctyl sebacate), polyol esters (such as trimethylolpropane caprylate; trimethylolpropane pelargonate; trimethylolpropane ester such as trimethylolpropane isostearinate; pentaerythritol ester such as pentaerythritol-2-ethyl hexanoate and pentaerythritol pelargonate), polyoxyalkylene glycol, dialkyldiphenyl ether, and polyphenyl ether. Among these synthetic oil compounds, preferred are poly-α-olefins, such as 1-octene oligomer and 1-decene oligomer and hydrides thereof.

As the base oil in the lubricating oil for the continuously variable transmission, the above-mentioned mineral and synthetic oil (compounds) may be used alone, or in the form of a mixture of any two or more thereof with no limitation on the mixture ratio.

The sulfur content of the base oil is not particularly restricted. The sulfur content is preferably not more than 0.2%, more preferably not more than 0.11, much more preferably not more than 0.05%. Additionally, it is preferable to use, as the base oil, mineral oil which is purified by hydrogenation or synthetic oil because such oil has a sulfur content of not more than 0.005% or substantially no sulfur content (not more than 5 ppm).

The aromatic content of the base oil is also not particularly restricted. The aromatic content of the base oil is preferably 15% or less, more preferably 10% or less, and most preferably 5% or less in order that the lubricating oil for the manual transmission of the automotive vehicle maintains its low friction characteristics for a long time. When the aromatic content exceeds 15%, the base oil undesirably deteriorates in oxidation stability.

Herein, the aromatic content is defined as the amount of aromatics fractions determined according to ASTM D2549 "Standard Test Method for Separation of Representative Aromatics and Nonaromatics Fractions of High-Boiling Oils by Elution Chromatography".

The kinematic viscosity of the base oil is not particularly restricted. When the lubricating oil is used for the lubricating oil for the continuously variable transmission, the kinematic viscosity of the base oil is preferably 2 mm$^2$/s or higher, more preferably 3 mm$^2$/s and, at the same time, is preferably 20 mm$^2$/s or lower, more preferably 10 mm$^2$/s or lower, most preferably 8 mm$^2$/s or lower, as measured at 100° C. When the kinematic viscosity is lower than 2 mm$^2$/s at 100° C., the lubricating oil can provide a sufficient wear resistance and be inferior in vaporization characteristics. When the kinematic viscosity exceeds 20 mm$^2$/s, the lubricating oil is difficult to exhibit a low frictional characteristics and may be degraded in vaporization characteristics, which are not preferable. In connection with the present invention, at least two base oils may be freely selected to be mixed to form a mixture, in which the kinematic viscosity of the single base oil may be out of the above-mentioned range as far as the kinematic viscosity of the mixture at 100° C. falls within the above-mentioned preferable range.

The viscosity index of the base oil is not particularly restricted, and is preferably 80 or higher, more preferably 100 or higher, most preferably 120 or higher, when the lubricating oil is used for the continuously variable transmission. Increasing the viscosity index of the base oil can provide the lubricating oil for the manual transmission, excellent in low temperature viscosity characteristics and fuel economy performance.

The organic oxygen-containing compound is preferably at least one compound selected from a group consisting of mono or polyalcohols, carboxylic acids, ethers, esters and their derivatives, and its content is preferably within a range of from 0.05 to 3.0% based on the total amount of the lube oil.

Examples of alcohols are mentioned below.
1.1 Monoalcohols.
1.2 Dialcohols.
1.3 Tri and higher polyalcohols.
1.4 Alkyleneoxide adducts of alcohols selected from the above 1 to 3.
1.5 Mixtures of one or more selected from the above 1.1 to 1.4.

Monoalcohols have one hydroxyl group in the molecule, including, for example, monohydric alkyl alcohols having from 1 to 40 carbon atoms (in which the alkyl group may be linear or branched) such as methanol, ethanol, propanol (1-propanol, 2-propanol), butanol (1-butanol, 2-butanol, 2-methyl-1-propanol, 2-methyl-2-propanol), pentanol (1-pentanol, 2-pentanol, 3-pentanol, 2-methyl-1-butanol, 3-methyl-1-butanol, 3-methyl-2-butanol, 2-methyl-2-butanol, 2,2-dimethyl-1-propanol), hexanol (1-hexanol, 2-hexanol, 3-hexanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2,3-dimethyl-1-butanol, 2,3-dimethyl-2-butanol, 3,3-dimethyl-1-butanol, 3,3-dimethyl-2-butanol, 2-ethyl-1-butanol, 2,2-dimethylbutanol), heptanol (1-heptanol, 2-heptanol, 3-heptanol, 2-methyl-1-hexanol, 2-methyl-2-hexanol, 2-methyl-3-hexanol, 5-methyl-2-hexanol, 3-ethyl-3-pentanol, 2,2-dimethyl-3-pentanol, 2,3-dimethyl-3-pentanol, 2,4-dimethyl-3-pentanol, 4,4-dimethyl-2-pentanol, 3-methyl-1-hexanol, 4-methyl-1-hexanol, 5-methyl-1-hexanol, 2-ethylpentanol), octanol (1-octanol, 2-octanol, 3-octanol, 4-methyl-3-heptanol, 6-methyl-2-heptanol, 2-ethyl-1-hexanol, 2-propyl-1-pentanol, 2,4,4-trimethyl-1-pentanol, 3,5-dimethyl-1-hexanol, 2-methyl-1-heptanol, 2,2-dimethyl-1-hexanol), nonanol (1-nonanol, 2-nonanol, 3,5,5-trimethyl-1-hexanol, 2,6-dimethyl-4-heptanol, 3-ethyl-2,2-dimethyl-3-pentanol, 5-methyloctanol, etc.), decanol (1-decanol, 2-decanol, 4-decanol, 3,7-dimethyl-1-octanol, 2,4,6-trimethylheptanol, etc.), undecanol, dodecanol, tridecanol, tetradecanol, pentadecanol, hexadecanol, heptadecanol, octadecanol (stearyl alcohol, etc.), nonadecanol, eicosanol, heneicosanol, tricosanol, tetracosanol; monohydric alkenyl alcohols having from 2 to 40 carbon atoms (in which the alkenyl group may be linear or branched and the double bond may be in any desired position) such as ethenol, propenol, butenol, hexenol, octenol, decenol, dodecenol, octadecenol (oleyl alcohol, etc.); monohydric (alkyl)cycloalkyl alcohols having from 3 to 40 carbon atoms (in which the alkyl group may be linear or branched, and the alkyl group and the hydroxyl group may be in any desired position) such as cyclopentanol, cyclohexanol, cycloheptanol, cyclooctanol, methylcyclopentanol, methylcyclohexanol, dimethylcyclohexanol, ethylcyclohexanol, propylcyclohexanol, butylcyclohexanol, dimethylcyclohexanol, cyclopentylmethanol, cyclohexylethanol (1-cyclohexylethanol, 2-cyclohexylethanol, etc.), cyclohexylmethanol, cyclohexylpropanol (3-cyclohexylpropanol, etc.), cyclohexylbutanol (4-cyclohexylbutanol, etc.) butylcyclohexanol, 3,3,5,5-tetramethylcyclohexanol; (alkyl)aryl alcohols (in which the alkyl group may be linear or branched, and the alkyl group and the hydroxyl group may be in any desired position) such as phenyl alcohol, methylphenyl alcohol (o-cresol, m-cresol, p-cresol), creosol, ethylphenyl alcohol, propylphenyl alcohol, butylphenyl alcohol, butylmethylphenyl alcohol (3-methyl-6-tert-butylphenyl alcohol, etc.), dimethylphenyl alcohol, diethylphenyl alcohol, dibutylphenyl alcohol (2,6-di-tert-butylphenyl alcohol, 2,4-di-tert-butylphenyl alcohol, etc.), dibutylmethylphenyl alcohol (2,6-di-tert-butyl-4-methylphenyl alcohol, etc.), dibutylethylphenyl alcohol (2,6-di-tert-butyl-4-ethylphenyl alcohol, etc.), tributylphenyl alcohol (2,4,6-tri-tert-butylphenyl alcohol, etc.), naphthol ($\alpha$-naphthol, $\beta$-naphthol, etc.), dibutylnaphthol (2,4-di-tert-butyl-$\alpha$-naphthol, etc.); 6-(4-hydroxy-3,5-di-tert-butylanilino)-2,4-bis(n-octylthio)-1,3,5-triazine, and their mixtures.

Of those, more preferred are linear or branched alkyl or alkenyl alcohols having from 12 to 18 carbon atoms such as oleyl alcohol and stearyl alcohol, in that they may more effectively lower the friction between the sliding member coated with the hard carbon thin film and the sliding surface of any other material and that they are poorly volatile and therefore may exhibit their friction-reducing effect even at high temperatures.

Dialcohols are concretely those having two hydroxyl groups in the molecule, including, for example, alkyl or alkenyldiols having from 2 to 40 carbon atoms (in which the alkyl or alkenyl group may be linear or branched, the double bond of the alkenyl group may be in any desired position, and the hydroxyl group may also be in any desired position) such as ethylene glycol, diethylene glycol, polyethylene glycol, propylene glycol, dipropylene glycol, polypropylene glycol, neopentyl glycol, 1,3-propanediol, 1,4-butanediol, 1,2-butanediol, 2-methyl-1,3-propanediol, 1,5-pentanediol, 1,6-hexanediol, 2-ethyl-2-methyl-1,3-propanediol, 2-methyl-2,4-pentanediol, 1,7-heptanediol, 2-methyl-2-propyl-1,3-propanediol, 2,2-diethyl-1,3-propanediol, 1,8-octanediol, 1,9-nonanediol, 2-butyl-2-ethyl-1,3-propanediol, 1,10-decanediol, 1,11-undecanediol, 1,12-dodecanediol, 1,13-tridecanediol, 1,14-tetradecanediol, 1,15-heptadecanediol, 1,16-hexadecanediol, 1,17-heptadecanediol, 1,18-octadecanediol, 1,19-nonadecanediol, 1,20-eicosadecanediol; (alkyl)cycloalkanediols (in which the alkyl group may be linear or branched, and the alkyl group and the hydroxyl group may be in any desired position) such as cyclohexanediol, methylcyclohexanediol; dihydric (alkyl)aryl alcohols having from 2 to 40 carbon atoms (in which the alkyl group may be linear or branched, and the alkyl group and the hydroxyl group may be in any desired position) such as benzenediol (catechol, etc.), methylbenzenediol, ethylbenzenediol, butylbenzenediol (p-tert-butylcatechol, etc.) dibutylbenzenediol (4,6-di-tert-butylresorcinol, etc.), 4,4'-thiobis(3-methyl-6-tert-butylphenol), 4,4'-butylidenebis(3-methyl-6-tert-butylphenol), 2,2'-methylenebis(4-methyl-6-tert-butylphenol), 2,2'-thiobis(4,6-di-tert-butylresorcinol), 2,2'-methylenebis(4-ethyl-6-tert-butylphenol), 4,4'-methylenebis(2,6-di-tert-butylphenol), 2,2'-(3,5-di-tert-butyl-4-hydroxy)propane, 4,4'-cyclohexylidenebis(2,6-di-tert-butylphenol); p-tert-butylphenol/formaldehyde condensate, p-tert-butylphenol/acetaldehyde condensate; and their mixtures.

Of those, preferred are ethylene glycol, propylene glycol, neopentyl glycol, 1,4-butanediol, 1,5-pentanediol, neopentyl glycol, 1,6-hexanediol, 2-methyl-2,4-pentanediol, 2-ethyl-2-methyl-1,3-propanediol, 1,7-heptanediol, 1,8-octanediol, 1,9-nonanediol, 1,10-decanediol, 1,11-undecanediol and 1,12-dodecanediol, in that they may more effectively lower the friction between the sliding member coated with the hard carbon thin film and the sliding surface of any other material. In addition, high-molecular-weight hindered alcohols having a molecular weight of at least 300, preferably at least 400 such as 2,6-di-tert-butyl-4-(3,5-di-tert-butyl-4-hydroxybenzyl) phenyl alcohol are also preferred in that they are hardly volatile even at high temperatures (for example, under sliding condition in internal-combustion engines) and are highly resistant to heat, and they can well exhibit their friction-reducing effect and can impart excellent antioxidation stability to the lubricating oil.

Tri- and higher polyalcohols are concretely those having three or more hydroxyl groups. In general, tri- to deca-alcohols, preferably tri- to hexa-alcohols are used. Examples of these components are trimethylolalkanes such as glycerin, trimethylolethane, trimethylolpropane, trimethylolbutane; as well as erythritol, pentaerythritol, 1,2,4-butanetriol, 1,3,5-pentanetriol, 1,2,6-hexanetriol, 1,2,3,4-butanetetrol, sorbitol, adonitol, arabitol, xylitol, mannitol; and their polymers or condensates (e.g., glycerin dimers to octamers such as diglycerin, triglycerin, tetraglycerin; trimethylolpropane dimers to octamers such as ditrimethylolpropane; pentaerythritol dimers to tetramers such as dipentaerythritol; sorbitan; condensates such as sorbitol/glycerin condensate (including intramolecular condensates, intermolecular condensates, and self-condensates)).

Saccharides such as xylose, arabitol, ribose, rhamnose, glucose, fructose, galactose, mannose, sorbose, cellobiose, mannose, isomaltose, trehalose and sucrose are also usable.

Of those, more preferred are tri to hexa-alcohols such as glycerin, trimethylolalkanes (e.g., trimethylolethane, trimethylolpropane, trimethylolbutane), pentaerythritol, 1,2,4-butanetriol, 1,3,5-pentanetriol, 1,2,6-hexanetriol, 1,2,3,4-butanetetrol, sorbitol, sorbitan, sorbitol/glycerin condensate, adonitol, arabitol, xylitol, mannitol, and their mixtures; and even more preferred are glycerin, trimethylolethane, trimethylolpropane, pentaerythritol, sorbitan and their mixtures. Especially preferred are polyalcohols having an oxygen content of at least 20%, preferably at least 30%, more preferably at least 40%. Polyalcohols that are higher than hexa-alcohols will too much increase the viscosity of the lubricating oil.

The above component 1.4 includes alkylene oxide adducts of alcohols selected from 1.1 to 1.3. Concretely, they are prepared by adding an alkylene oxide having from 2 to 6, preferably from 2 to 4 carbon atoms or its polymer or copolymer to the alcohol to thereby hydrocarbyletherify or hydrocarbylesterify the hydroxyl group of the alcohol. The alkylene oxide having from 2 to 6 carbon atoms includes ethylene oxide, propylene oxide, 1,2-epoxybutane ($\alpha$-butylene oxide), 2,3-epoxybutane ($\beta$-butylene oxide), 1,2-epoxy-1-methylpropane, 1,2-epoxyheptane, 1,2-epoxyhexane. Of those, preferred are ethylene oxide, propylene oxide and butylene oxide, in that they are more effective for reducing friction; and more preferred are ethylene oxide and propylene oxide.

When two or more different types of alkylene oxides are used herein, the mode of oxyalkylene polymerization is not specifically defined, and the groups may be random-copolymerized or block-copolymerized. When an alkylene oxide is added to a polyalcohol having from 2 to 6 hydroxyl groups, it may be added to all the hydroxyl groups of the polyalcohol or may be added to a part of the hydroxyl groups thereof.

Examples of carboxylic acids are mentioned below.
2.1 Aliphatic monocarboxylic acids (fatty acids).
2.2 Aliphatic polycarboxylic acids.
2.3 Carbon-cyclic carboxylic acids.
2.4 Heterocyclic carboxylic acids.
2.5 Mixtures of two or more selected from the above 2.1 to 2.4.

Aliphatic monocarboxylic acids (fatty acids) are concretely those having one carboxyl group in the molecule, including, for example, saturated aliphatic monocarboxylic acids having from 1 to 40 carbon atoms (in which the saturated aliphatic structure may be linear or branched) such as methanoic acid, ethanoic acid (acetic acid), propanoic acid (propionic acid), butanoic acid (butyric acid, isobutyric acid, etc.), pentanoic acid (valeric acid, isovaleric acid, pivalic acid, etc.), hexanoic acid (caproic acid, etc.), heptanoic acid, octanoic acid (caprylic acid, etc.), nonanoic acid (pelargonic acid, etc.), decanoic acid, undecanoic acid, dodecanoic acid (lauric acid, etc.), tridecanoic acid, tetradecanoic acid (myristic acid, etc.), pentadecanoic acid, hexadecanoic acid (palmitic acid, etc.), heptadecanoic acid, octadecanoic acid (stearic acid, etc.), nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid; and unsaturated aliphatic monocarboxylic acids having from 1 to 40 carbon atoms (in which the unsaturated aliphatic structure may be linear or branched, and the unsaturated bond may be in any desired position) such as propenoic acid (acrylic acid, etc.), propynoic acid (propiolic acid, etc.), butenoic acid (methacrylic acid, crotonic acid, isocrotonic acid, etc.), pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, octadecenoic acid (oleic acid, etc.), nonadecenoic acid, eicosenoic acid, heneicosenoic acid, docosenoic acid, tricosenoic acid, tetracosenoic acid, pentacosenoic acid, hexacosenoic acid, heptacosenoic acid, octacosenoic acid, nonacosenoic acid, triacontenoic acid.

Aliphatic polycarboxylic acids include saturated or unsaturated aliphatic dicarboxylic acids having from 2 to 40 carbon atoms (in which the saturated aliphatic or unsaturated aliphatic structure may be linear or branched, and the unsaturated bond may be in any desired position) such as ethane-diacid (oxalic acid), propane-diacid (malonic acid, etc.), butane-diacid (succinic acid, methylmalonic acid, etc.), pentane-diacid (glutaric acid, ethylmalonic acid, etc.), hexane-diacid (adipic acid, etc.), heptane-diacid (pimelic acid, etc.), octane-diacid (suberic acid, etc.), nonane-diacid (azelaic acid, etc.), decane-diacid (sebacic acid, etc.), propene-diacid, butene-diacid (maleic acid, fumaric acid, etc.), pentene-diacid (citraconic acid, mesaconic acid, etc.), hexene-diacid, heptene-diacid, octene-diacid, nonene-diacid, decene-diacid; saturated or unsaturated tricarboxylic acids (in which the saturated aliphatic or unsaturated aliphatic structure may be linear or branched, and the unsaturated bond may be in any desired position) such as propane-tricarboxylic acid, butane-tricarboxylic acid, pentane-tricarboxylic acid, hexane-tricarboxylic acid, heptane-tricarboxylic acid, octane-tricarboxylic acid, nonane-tricarboxylic acid, decane-tricarboxylic acid; and saturated or unsaturated tetracarboxylic acids (in which the saturated aliphatic or unsaturated aliphatic structure may be linear or branched, and the unsaturated bond may be in any desired position).

Carbon-cyclic carboxylic acids are concretely those having one or more carboxyl groups in the carbon-cyclic molecule, including, for example, naphthene ring-having, mono, di, tri or tetracarboxylic acids having from 3 to 40 carbon atoms (in which the alkyl or alkenyl group, if any therein, may be linear or branched, and the double bond, if any therein, may be in any desired position, and the number and the position of the substituents are not defined) such as cyclohexane-monocarboxylic acid, methylcyclohexane-monocarboxylic acid, ethylcyclohexane-monocarboxylic acid, propylcyclohexane-monocarboxylic acid, butylcyclohexane-monocarboxylic acid, pentylcyclohexane-monocarboxylic acid, hexylcyclohexane-monocarboxylic acid, heptylcyclohexane-monocarboxylic acid, octylcyclohexane-monocarboxylic acid, cycloheptane-monocarboxylic acid, cyclooctane-monocarboxylic acid, trimethylcyclopentane-dicarboxylic acid (camphor acid, etc.); aromatic monocarboxylic acids having from 7 to 40 carbon atoms such as benzenecarboxylic acid (benzoic acid), methylbenzenecarboxylic acid (toluic acid, etc.), ethylbenzenecarboxylic acid, propylbenzenecarboxylic acid, benzenedicarboxylic acid (phthalic acid, isophthalic acid, terephthalic acid, etc.), benzenetricarboxylic acid (trimellitic acid, etc.), benzeneteracarboxylic acid (pyromellitic acid, etc.), naphthalenecarboxylic acid (naphthoic acid, etc.); mono, di, tri or tetracarboxylic acids having an aryl group with from 7 to 40 carbon atoms (in which the alkyl or alkenyl group, if any therein as a substituent, may be linear or branched and the double bound, if any therein, may be in any desired position, and the number and the position of the substituents are not defined) such as phenylpropanoic acid (hydroatropic acid), phenylpropenoic acid (atropic acid, cinnamic acid, etc.), salicylic acid, alkylsalicylic acid having one or more alkyl groups with from 1 to 30 carbon atoms.

Heterocyclic carboxylic acids are concretely those having one or more carboxyl groups in the molecule, including, for example, those having from 5 to 40 carbon atoms such as furanecarboxylic acid, thiophenecarboxylic acid, pyridinecarboxylic acid (nicotinic acid, isonicotinic acid, etc.).

Examples of ethers are mentioned below.

3.1 Saturated or unsaturated aliphatic ethers.
3.2 Aromatic ethers.
3.3 Cyclic ethers.
3.4 Mixtures of two or more selected from the above 3.1 to 3.3.

Aliphatic monoethers are concretely saturated or unsaturated aliphatic ethers having from 1 to 40 carbon atoms (in which the saturated or unsaturated aliphatic structure may be linear or branched, and the unsaturated bond may be in any desired position) such as dimethyl ether, diethyl ether, di-n-propyl ether, diisopropyl ether, dibutyl ether, diisobutyl ether, di-n-amyl ether, diisoamyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, diheptadecyl ether, dioctadecyl ether, dinonadecyl ether, dieicosyl ether, methyl ethyl ether, methyl n-propyl ether, methyl isopropyl ether, methyl isobutyl ether, methyl tert-butyl ether, methyl n-amyl ether, methyl isoamyl ether, ethyl n-propyl ether, ethyl isopropyl ether, ethyl isobutyl ether, ethyl tert-butyl ether, ethyl n-amyl ether, ethyl isoamyl ether, divinyl ether, diallyl ether, methyl vinyl ether, methyl allyl ether, ethyl vinyl ether, ethyl allyl ether.

Concretely, aromatic ethers include, for example, anisole, phenetole, phenyl ether, benzyl ether, phenyl benzyl ether, α-naphthyl ether, β-naphthyl ether, polyphenyl ether, perfluoroether; and these may have a saturated or unsaturated group (in which the saturated or unsaturated group may be linear or branched, and the unsaturated bond may be in any desired position, and the number and the position of the substituents are not defined). Preferably, these are liquid under the service condition thereof, especially at room temperature.

Concretely, cyclic ethers are those having from 2 to 40 carbon atoms, including, for example, ethylene oxide, propylene oxide, trimethylene oxide, tetrahydrofuran, tetrahydropyran, dioxane, glycidyl ether; and these may have a saturated or unsaturated group, a carbon ring, or a saturated or unsaturated aliphatic group-having carbon ring (in which the saturated or unsaturated group may be linear or branched, and the unsaturated bond may be in any desired position, and the number and the position of the substituents are not defined).

Examples of esters are mentioned below.

4.1 Esters of aliphatic monocarboxylic acids (fatty acids).
4.2 Esters of aliphatic polycarboxylic acids.
4.3 Esters of carbon-cyclic carboxylic acids.
4.4 Esters of heterocyclic carboxylic acids.
4.5 Alkylene oxide adducts of alcohols or esters.
4.6 Mixtures of any compounds selected from the above 4.1 to 4.5.

Esters of the above 4.1 to 4.5 may be complete esters in which the hydroxyl group and the carboxyl group are all esterified, or partial esters in which the hydroxyl group or the carboxyl group partially remains as such.

The component of the above 4.1 is an ester of one or more selected from the above-mentioned aliphatic monocarboxylic acids (fatty acids) and one or more selected from the above-mentioned mono, di, tri or higher polyalcohols, and it includes an ashless fatty acid ester friction modifier. The ashless fatty acid ester friction modifier is a fatty acid ester having a linear or branched hydrocarbon group with from 6 to 30, preferably from 8 to 24, more preferably from 10 to 20 carbon atoms, and it includes esters of fatty acids having such a hydrocarbon group and aliphatic mono alcohols or aliphatic polyalcohols. The fatty acids as referred to herein are aliphatic monocarboxylic acids. Concretely, preferred examples of the esters are glycerin monooleate, glycerin dioleate, sorbitan monooleate, sorbitan dioleate, and the like.

The component 4.1 except the ashless fatty acid ester friction modifier includes fatty acid esters having a linear or branched hydrocarbon group with from 1 to 5 or from 31 to 40 carbon atoms. Their examples are esters of fatty acids having such a hydrocarbon group and aliphatic monoalcohols or aliphatic polyalcohols.

Of the above, those having a kinematic viscosity at 100° C. of from 1 to 100 mm$^2$/sec may be used for the base oil for lube oil, and are generally differentiated from the above-mentioned ashless fatty acid ester friction modifier. Their examples are polyol esters such as single esters or complex esters that are formed of tri or higher polyols having from 3 to 40, preferably from 4 to 18, more preferably from 4 to 12 carbon atoms, especially tri or higher polyols having a neopentyl structure, and one or more selected from monocarboxylic acids having from 1 to 40, preferably from 4 to 18, more preferably from 6 to 12 carbon atoms, and their mixtures, as well as their adducts with alkylene oxides added thereto, for example, trimethylolpropane caprylate, trimethylolpropane pelargonate, pentaerythritol 2-ethylhexanoate, pentaerythritol pelargonate. These may be complete esters in which the hydroxyl group and the carboxyl group are all esterified, or partial esters in which the hydroxyl group or the carboxyl group partly remains as such. However, they are preferably complete esters. The hydroxyl value of the esters is generally at most 100 mg KOH/g, preferably at most 50 mg KOH/g, more preferably at most 10 mg KOH/g.

Preferably, the kinematic viscosity at 100° C. of the base oil for lube oil is from 2 to 60 mm$^2$/sec, more preferably from 3 to 50 mm$^2$/sec.

The component 4.2 is an ester of one or more selected from the above-mentioned aliphatic polycarboxylic acids and one or more selected from the above-mentioned mono, di, tri or higher polyalcohols. Its preferred examples are diesters of one or more polycarboxylic acid selected from dicarboxylic acids having from 2 to 40, preferably from 4 to 18, more preferably from 6 to 12 carbon atoms, and one or more selected from monoalcohols having from 4 to 40, preferably from 4 to 18, more preferably from 6 to 14, such as dibutyl maleate, ditridecyl glutamate, di-2-ethylhexyl adipate, diisodecyl adipate, ditridecyl adipate, di-2-ethylhexyl sebacate, and copolymers of these diesters (e.g., dibutyl maleate) and poly-α-olefins having from 4 to 16 carbon atoms; and esters of α-olefin adducts to acetic anhydride or the like, and alcohols having from 1 to 40 carbon atoms. Of the compounds, those having a kinematic viscosity at 100° C. of from 1 to 100 mm$^2$/sec may be used for the base oil for the lubricating oil.

The component 4.3 is an ester of one or more selected from the above-mentioned carbon-cyclic carboxylic acids, and one or more selected from the above-mentioned mono, di, tri or higher polyalcohols. Its preferred examples are aromatic carboxylic esters such as phthalic acid esters, trimellitic acid esters, pyromellitic acid esters, salicylic acid esters. Of the esters, those having a kinematic viscosity at 100° C. of from 1 to 100 mm$^2$/sec may be used for the base oil for the lubricating oil.

The component 4.4 is an ester of one or more selected from the above-mentioned heterocyclic carboxylic acids, and one or more selected from the above-mentioned mono, di, tri or higher polyalcohols. Of the esters, those having a kinematic viscosity at 100° C. of from 1 to 100 mm$^2$/sec may be used for the base oil for the lubricating oil.

The component 4.5 includes esters prepared by adding an alkylene oxide to one or more selected from the above-mentioned mono, di, tri or higher polyalcohols followed by esterifying them; and adducts prepared by adding an alkylene oxide to the esters selected from the above-mentioned components 4.1 to 4.4. Of the compounds, those having a kinematic viscosity at 100° C. of from 1 to 100 mm$^2$/sec may be used for the base oil for lube oil.

Derivatives of the above-mentioned organic oxygen-containing compounds concretely include, for example, those prepared by sulfidizing one selected from the above-mentioned alcohols, carboxylic acids, esters and ethers; those prepared by halogenating (fluorinating, chlorinating) it; its reaction products with acids, such as sulfuric acid, nitric acid, boric acid, phosphoric acid, or their esters or metal salts; and its reaction products with metals, metal-containing compounds or amine compounds.

Of those, preferred are reaction products of one or more selected from alcohols and carboxylic acids and their derivatives, with amine compounds (e.g., Mannich reaction products, acylated products, amides).

The amine compounds as referred to herein include ammonia, monoamines, diamines, and polyamines. More concretely, their examples are ammonia; alkylamines having an alkyl group with from 1 to 30 carbon atoms (in which the alkyl group may be linear or branched) such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, stearylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, methylethylamine, methyl-propylamine, methylbutylamine, ethylpropylamine, ethylbutylamine, and propylbutylamine; alkenylamines having an alkenyl group with from 2 to 30 carbon atoms (in which the alkenyl group may be linear or branched) such as ethenylamine, propenylamine, butenylamine, octenylamine, and oleylamine; alkanolamines having an alkanol group with from 1 to 30 carbon atoms (in which the alnanol group may be linear or branched) such as methanolamine, ethanolamine, propanolamine, butanolamine, pentanolamine, hexanolamine, heptanolamine, octanolamine, nonanolamine, methanolethanolamine, methanolpropanolamine, methanolbutanolamine, ethanolpropanolamine, ethanolbutanolamine, and propanolbutanolamine; alkylenediamines having an alkylene group with from 1 to 30 carbon atoms, such as methylenediamine, ethylenediamine, propylenediamine, and butylenediamine; polyamines such as diethylenetriamine, triethylenetetramine, tetraethylenepentamine, pentaethylenehexamine; compounds derived from the above-mentioned monoamines, diamines or polyamines and further having an alkyl or alkenyl group with from 8 to 20 carbon atoms, such as undecyldiethylamine, undecyldiethanolamine, dodecyldipropanolamine, oleyldiethanolamine, oleylpropylenediamine, stearyltetraethylenepentamine; heterocyclic compounds such as N-hydroxyethyloleylimidazoline; alkylene oxide adducts of these compounds; and their mixtures.

Of those nitrogen-containing compounds, preferred are aliphatic amines having an alkyl or alkenyl group with from 10 to 20 carbon atoms (these may be linear or branched) such as decylamine, dodecylamine, tridecylamine, heptadecylamine, octadecylamine, oleylamine and stearylamine.

Of the derivatives of these oxygen-containing organic compounds, preferred are carbonamides having from 8 to 20 carbon atoms such as oleamide.

Examples of the aliphatic amine compound are aliphatic amine compounds each having $C_6$-$C_{30}$ straight or branched hydrocarbon chains or groups, preferably $C_8$-$C_{24}$ straight or branched hydrocarbon chains, more preferably $C_{10}$-$C_{20}$ straight or branched hydrocarbon chains. When the carbon number of the hydrocarbon chain is not within the range of 6 to 30, there arises a possibility that the lubricating oil may not produce a sufficient friction reducing effect as expected.

Specific examples of the $C_6$-$C_{30}$ straight or branched hydrocarbon chain include: alkyl groups, such as hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl, tetracosyl, pentacosyl, hexacosyl, heptacosyl, octacosyl, nonacosyl and triacontyl; and alkenyl groups, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, heneicosenyl, docosenyl, tricosenyl, tetracosenyl, pentacosenyl, hexacosenyl, heptacosenyl, octacosenyl, nonacosenyl and triacontenyl. The above alkyl and alkenyl groups include all possible isomers. Additionally, the position of alkenyl groups is free.

The aliphatic amine compound can be exemplified by aliphatic monoamines and alkylene oxide adducts thereof, aliphatic polyamines, imidazoline compounds, and derivatives thereof. Specific examples of such aliphatic amines include: aliphatic amine compounds, such as laurylamine, lauryldiethylamine, lauryldiethanolamine, dodecyldipropanolamine, palmitylamine, stearylamine, stearyltetraethylenepentamine, oleylamine, oleylpropylenediamine, oleyldiethanolamine and N-hydroxyethyloleylimidazolyne; adducts of the above aliphatic amines ($C_6$-$C_{28}$ alkyl or alkenyl amines) with alkylene oxides, such as N,N-dipolyoxyalkylene-N-alkylamines; and acid-modified compounds prepared by reacting the above aliphatic amines with $C_2$-$C_{30}$ monocarboxylic acids (such as fatty acids) or $C_2$-$C_{30}$ polycarboxylic acids (such as oxalic acid, phthalic acid, trimellitic acid and pyromellitic acid) so as to neutralize or amidate the whole or part of the remaining amino and/or imino groups. In connection with the present invention, N,N-dipolyoxyethylene-N-oleylamine is preferably used.

The amount (content) of the aliphatic amine compound contained in the lubricating oil for the manual transmission is not particularly restricted, and is preferably 0.05 to 3.0%, more preferably 0.1 to 2.0%, and most preferably 0.5 to 1.4%, based on the total mass of the lubricating oil. When the amount of the fatty acid ester friction modifier and/or the aliphatic amine friction modifier is less than 0.05%, there arises a possibility that the lubricating oil may not produce a sufficient friction reducing effect. When the amount of the fatty acid ester friction modifier and/or the aliphatic amine friction modifier exceeds 3.0%, the lubricating oil produce a good friction reducing effect but undesirably deteriorates in storage stability and compatibility to cause precipitations.

Further, the continuously variable transmission oil or lubricating oil for the continuously variable transmission, used in the present invention preferably includes polybutenyl succinimide and/or a derivative thereof as an ashless dispersant. Specific examples of the polybutenyl succinimide usable in connection with the present invention include compounds represented by the following general formulas (1) and (2).

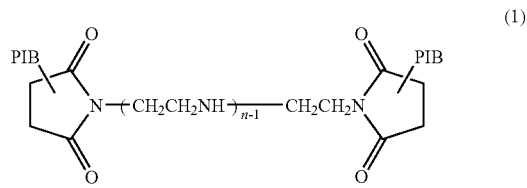

(1)

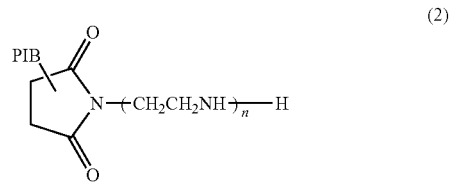

(2)

In each of the formulas (1) and (2), n represents an integer of 1 to 5, preferably 2 to 4, so as to attain a good detergent effect. Further, PIB represents a polybutenyl group derived from polybutene. The polybutene can be prepared by polymerizing high-purity isobutene or a mixture of 1-butene and isobutene in the presence of a boron fluoride catalyst or an aluminum chloride catalyst in such a manner that the polybutene attains a number-average molecular weight of 900 to 3,500, preferably 1,000 to 2,000. When the number-average molecular weight of the polybutene is less than 900, there is a possibility of failing to attain a sufficient detergent effect. When the number-average molecular weight of the polybutene exceeds 3,500, the polybutene may undesirably deteriorate in low-temperature fluidity. In the production of the polybutenyl succinimide, the polybutene may be used after purified by removing trace amounts of fluorine and chlorine residues, which result from the above polybutene production catalyst, by any suitable treatment (such as adsorption process or washing process). The amount of the fluorine and chlorine residues is preferably controlled to 50 ppm or less, more preferably 10 ppm or less, most preferably 1 ppm or less.

The production method of the polybutenyl succinimide is not particularly restricted. For example, the polybutenyl succinimide can be prepared by reacting an chloride of the above-mentioned polybutene, or the polybutene from which fluorine and chlorine residues are removed, with maleic anhydride at 100 to 200° C. to form polybutenyl succinate, and then, reacting the thus-formed polybutenyl succinate with polyamine (such as diethylene triamine, triethylene tetramine, tetraethylene pentamine or pentaethylene hexamine).

The polybutenyl succinimide derivative can be exemplified by boron- and acid-modified compounds obtained by reacting the polybutenyl succinimide of the formulas (1) and (2) with boron compounds or oxygen-containing organic compounds so as to neutralize or amidate the whole or part of the remaining amino and/or imide groups. Among these, boron-containing polybutenyl succinimide, especially boron-containing bis(polybutenyl)succinimide, is preferably used.

The above boron compound can be a boric acid, a borate or a boric acid ester. Specific examples of the boric acid include orthoboric acid, metaboric acid and paraboric acid. Specific examples of the borate include: ammonium salts including ammonium borates, such as ammonium metaborate, ammonium tetraborate, ammonium pentaborate and ammonium octaborate. Specific examples of the boric acid ester include: esters of boric acids and alkylalcohols (preferably $C_1$-$C_6$ alkylalcohols), such as monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate. Here, the content ratio of nitrogen to boron (B/N) by mass in the boron-containing polybutenyl succinimide is usually 0.1 to 3, preferably 0.2 to 1.

The above organic oxygen-containing compound can be exemplified by: $C_1$-$C_{30}$ monocarboxylic acids, such as formic acid, acetic acid, glycolic acid, propionic acid, lactic acid, butyric acid, valeric acid, caproic acid, enanthic acid, caprylic acid, pelargonic acid, capric acid, undecylic acid, lauric acid, tridecanoic acid, myristic acid, pentadecanoic acid, palmitic acid, margaric acid, stearic acid, oleic acid, nonadecanoic acid and eicosanoic acid; $C_2$-$C_{30}$ polycarboxylic acids, such as oxalic acid, phthalic acid, trimellitic acid and pyromellitic acid, and anhydrides and esters thereof; $C_2$-$C_6$ alkylene oxides; and hydroxy(poly)oxyalkylene carbonates.

The amount of the polybutenyl succinimide and/or the derivative thereof added in the lubricating oil is not particularly restricted, and is preferably 0.1 to 15%, more preferably 1.0 to 12%, based on the total mass of the lubricating oil. When the amount of the polybutenyl succineimide and/or derivative thereof is less than 0.1%, there arises a possibility of failing to attain a sufficient detergent effect. It becomes uneconomical when the amount of the polybutenyl succineimide and/or the derivative thereof exceeds 15%. In addition, such a large amount of the polybutenyl succineimide and/or the derivative thereof tends to cause a deterioration in demulsification ability.

As discussed above, in connection with the present invention, the lubricating oil can exhibit an extremely excellent low friction characteristics in case of being used between the sliding surface of the hard carbon thin film such as the DLC film and the opposite member. In order to raise performances required for the lubricating oil (composition) for the continuously variable transmission, the lubricating oil may contain other additives, such as a metallic detergent, an antioxidant, a viscosity index improver, a friction modifier other than the above-mentioned fatty acid ester friction modifier and/or the aliphatic amine friction modifier, an ashless dispersant other than the above-mentioned polybutenyl succinimide and/or the derivative thereof, an anti-wear agent or extreme-pressure additive (agent), a rust inhibitor, a nonionic surfactant, a deemulsifier, a metal deactivator and/or an anti-foaming agent, when used in an internal combustion engine. These additives may be used alone or in the form of a mixture of two or more thereof so as to meet the lubricating oil performance required.

The metallic detergent can be any metallic-detergent compound commonly used for a lubricating oil. Specific examples of the metallic detergent usable in connection with the present invention include sulfonates, phenates and salicylates of alkali metals or alkali-earth metals; and mixtures of two or more thereof. Examples of the alkali metals include sodium (Na) and potassium (K), and examples of the alkali-earth metals include calcium (Ca) and magnesium (Mg). In connection with the present invention, sodium and calcium sulfonates, sodium and calcium phenates, and sodium and calcium salicylates are suitably used. The total base number and amount of the metallic detergent can be selected in accordance with the lubricating oil performance required. The total base number of the metallic detergent is usually 0 to 500 mgKOH/g, preferably 150 to 400 mgKOH/g, as measured by perchloric acid method according to ISO 3771 "Determination of base number—Perchloric acid potentiometric titration method". The amount of the metallic detergent is usually 0.1 to 10% based on the total mass of the lubricating oil.

The antioxidant can be any antioxidant compound commonly used for a lubricating oil. Specific examples of the antioxidant usable in connection with the present invention include: phenolic antioxidants, such as 4,4'-methylenebis(2, 6-di-tert-butylphenol) and octadecyl-3-(3,5-di-tert-butyl-4-hydroxyphenyl)propionate; amino antioxidants, such as phenyl-α-naphthylamine, alkylphenyl-α-naphthylamine and alkyldiphenylamine; and mixtures of two or more thereof. The amount of the antioxidant is usually 0.01 to 5% based on the total mass of the lubricating oil.

The viscosity index improver can be exemplified by: non-dispersion type viscosity index improvers, such as copolymers of one or two monomers selected from various methacrylic acids, and hydrides of the copolymers; and dispersion type viscosity index improvers, such as copolymers of methacrylates (including nitrogen compounds). There may be also used, as the viscosity index improver, copolymers of ethylene and α-olefins (such as propylene, 1-butene and 1-pentene) and hydrides thereof, polyisobutylenes and hydrides thereof, a hydrogenated copolymer of styrene and diene, a copolymer of styrene and maleic anhydride and polyalkylstyrenes.

The molecular weight of the viscosity index improver needs to be selected in view of shear stability. For example, the number-average molecular weight of the viscosity index improver is desirably in a range of 5,000 to 1,000,000, more desirably 100,000 to 800,000, for dispersion or non-dispersion type polymethacrylates; in a range of 800 to 5,000 for polyisobutylenes and hydrides thereof; and in a range of 800 to 300,000, more desirably 10,000 to 200,000 for ethylene/α-olefin copolymers and hydrides thereof. The above viscosity index improving compounds can be used alone or in the form of a mixture of two or more thereof. The amount of the viscosity index improver is preferably 0.1 to 40.0 based on the total mass of the lubricating oil.

The friction modifier other than the above-mentioned the aliphatic amine compound can be exemplified by ashless friction modifiers, such as boric acid esters, higher alcohols and aliphatic ethers, and metallic friction modifiers, such as molybdenum dithiophosphate, molybdenum dithiocarbamate and molybdenum disulfide.

The ashless dispersant other than the above-mentioned polybutenyl succinimide and/or the derivative thereof can be exemplified by polybutenylbenzylamines and polybutenylamines each having polybutenyl groups of number-average molecular weight of 900 to 3,500, polybutenyl succinimides having polybutenyl groups of number-average molecular weight of less than 900 and derivatives thereof.

The anti-friction agent or extreme-pressure additive can be exemplified by disulfides, sulfurized fats and oils, olefin sulfides, phosphate esters having one to three $C_2$-$C_{20}$ hydrocarbon groups, thiophosphate esters, phosphite esters, thiophosphite esters and amine salts of these esters.

The rust inhibitor can be exemplified by alkylbenzene sulfonates, dinonylnaphthalene sulfonates, esters of alkenylsuccinic acids and esters of polyhydric alcohols.

The nonionic surfactant and the deemulsifier can be exemplified by noionic polyalkylene glycol surfactants, such as polyoxyethylene alkylethers, polyoxyethylene alkylphenyleters and polyoxyethylene alkylnaphthyleters.

The metal deactivator can be exemplified by imidazoline compounds, pyrimidine derivatives, thiazole and benzotriazole. The anti-foaming agent can be exemplified by silicones, fluorosilicones and fluoroalkylethers.

Each of the friction modifier other than the fatty acid ester friction modifier and/or the aliphatic amine friction modifier, the ashless dispersant other than the polybutenyl succinimide and/or the derivative thereof, the anti-wear agent or extreme-pressure additive, the rust inhibitor and the demulsifier is usually contained in an amount of 0.01 to 5% based on the total mass of the lubricating oil, and the metal deactivator is contained in an amount of 0.0005 to 1% based on the total mass of the lubricating oil.

Experiment 1

The invention is described more concretely with reference to the following Examples and Comparative Examples, which, however, are not intended to restrict the scope of the invention.

[Fabrication of Sliding Members]

A carburized SCM420 steel was used as a base material. This was formed into blocks and rings of the sizes defined by Falex Corporation for LFW-1 test (see "LFW-1 Test Condition" mentioned below).

Block:

Blocks of SCM420 steel were carburized and tempered at a low temperature, and their sliding face was polished and finished with a wrapping tape to have a surface roughness Ra of 0.03 μm. The surface of the thus-processed blocks was optionally processed by PVD or CVD to be coated with a coating material so as to form thereon a coating layer (hard carbon thin film) having a thickness of 1.1 μm, followed by being further polished and finished with a wrapping tape to have a surface roughness Ra of 0.03 μm.

Ring:

Rings of SCM420 steel were carburized and tempered at a low temperature, and their sliding face was polished and finished with a wrapping tape to have a surface roughness Ra of 0.04 μm. The details of the blocks and the rings thus prepared are summarized in Table 1.

TABLE 1

| Kinds of sliding members | Ring | | | Block | | | | | | |
| --- | --- | --- | --- | --- | --- | --- | --- | --- | --- | --- |
| | Base material (substrate) | Surface Roughness Ra, μm | Surface Hardness HRC | Base material (substrate) | Surface roughness Ra, μm | Surface hardness HRC | Coating material | Thickness, μm | Surface roughness Ra, μm | Surface hardness Hv |
| A | SCM420 carburized steel | 0.04 | 59 | SCM420 carburized steel | 0.03 | 59 | a-C | 1.1 | 0.03 | 1850 |
| B | SCM420 carburized steel | 0.04 | 59 | SCM420 carburized steel | 0.03 | 59 | DLC (a-C:H) | 1.1 | 0.03 | 1850 |
| C | SCM420 carburized steel | 0.04 | 59 | SCM420 carburized steel | 0.03 | 59 | none | — | — | — |

Note:
HRC indicates Rockwell hardness (C scale).

[Preparation of CVTF Composition]

A paraffin-based mineral oil (having a kinematic viscosity at 100° C. of 4.3 mm$^2$/sec) was prepared as a base oil. A fatty acid ester, aliphatic amine, amide or alcohol friction modifier, and CVTF package additive and polymethacrylate were suitably added to it to prepare a CVTF composition. The resulting CVTF composition was combined with the above-mentioned sliding parts as in Examples 1-1 to 1-11 and Comparative Examples 1-1 and 1-2. The details of these Examples and Comparative Examples are shown in Table 2.

In Table 2, the fatty acid ester is glycerin monooleate; the commercial product CVTF is Nissan genuine oil "NS-2", and this CVTF contains a friction modifier; and the CVTF package additive contains a mixture of detergent dispersant, anti-oxidant, anti-wear agent, anti-corrosive agent, pour point depressant, defoaming agent, and the like (but does not contain a friction modifier).

TABLE 2

|  | Example | | | | | | | | | | | Comparative Example | |
|---|---|---|---|---|---|---|---|---|---|---|---|---|---|
|  | 1-1 | 1-2 | 1-3 | 1-4 | 1-5 | 1-6 | 1-7 | 1-8 | 1-9 | 1-10 | 1-11 | 1-1 | 1-2 |
| Sliding members | A | A | A | A | A | A | A | B | B | B | B | B | C |
| Base oil (%) | 79.3 | 79.3 | 79.3 | 79.3 | 80 | 78.5 | (commer- | 79.3 | 79.3 | 79.3 | 79.3 | 80 | 79.3 |
| Fatty acid Ester (%) | 0.7 | — | — | — | — | 1.5 | cial | 0.7 | — | — | — | — | 0.7 |
| Aliphatic amine (%) | — | 0.7 | — | — | — | — | product, | — | 0.7 | — | — | — | — |
| Amide (%) | — | — | 0.7 | — | — | — | CVTF) | — | — | 0.7 | — | — | — |
| Alcohol (%) | — | — | — | 0.7 | — | — |  | — | — | — | 0.7 | — | — |
| CVTF Package Additive (%) | 10 | 10 | 10 | 10 | 10 | 10 |  | 10 | 10 | 10 | 10 | 10 | 10 |
| Polymethacrylate (%) | 10 | 10 | 10 | 10 | 10 | 10 |  | 10 | 10 | 10 | 10 | 10 | 10 |
| Friction coefficient | 0.035 | 0.04 | 0.04 | 0.04 | 0.07 | 0.03 | 0.035 | 0.09 | 0.1 | 0.1 | 0.1 | 0.13 | 0.12 |

[Performance Evaluation]

According to the LFW-1 test method defined in ASTM D2714, the samples were tested under the test condition mentioned below. From the friction force of each sample (the block) in 60 minutes after the start of the test, the friction coefficient thereof was calculated. The results obtained are shown in Table 4.

LFW-1 Test Condition:
Test Device: Falex Block-on-Ring Friction and Wear Testing Machine produced by Falex corporation;
Test Piece: Block (Falex Type H-60)
Ring (Falex Type S-10);
Sliding Velocity: 0.26 m/sec;
Load: 222.5 N;
Oil Temperature: 110° C.; and
Test Period: 60 minutes.

From Table 2, it will be understood that the combination of the friction modifier and DLC (a-C) brings about a great friction-reducing effect as compared with the case of DLC (a-C:H) alone or the case with no coating. At present, it is believed that Example 3-6 will be the best in point of the friction-reducing effect thereof.

As described hereinabove, in this embodiment, a certain continuously variable transmission oil composition is present in the site between the sliding member coated with the hard carbon thin film and an opposite member formed of any material. Accordingly, this embodiment provides a low-friction sliding member in continuously variable transmissions, the advantages of which are that its friction is extremely low and stable and it has good wear resistance, providing a non-stage transmission oil composition for it.

Second Embodiment

A second embodiment of a low-friction sliding member in a transmission, according to the present invention will be discussed.

Figure 2:
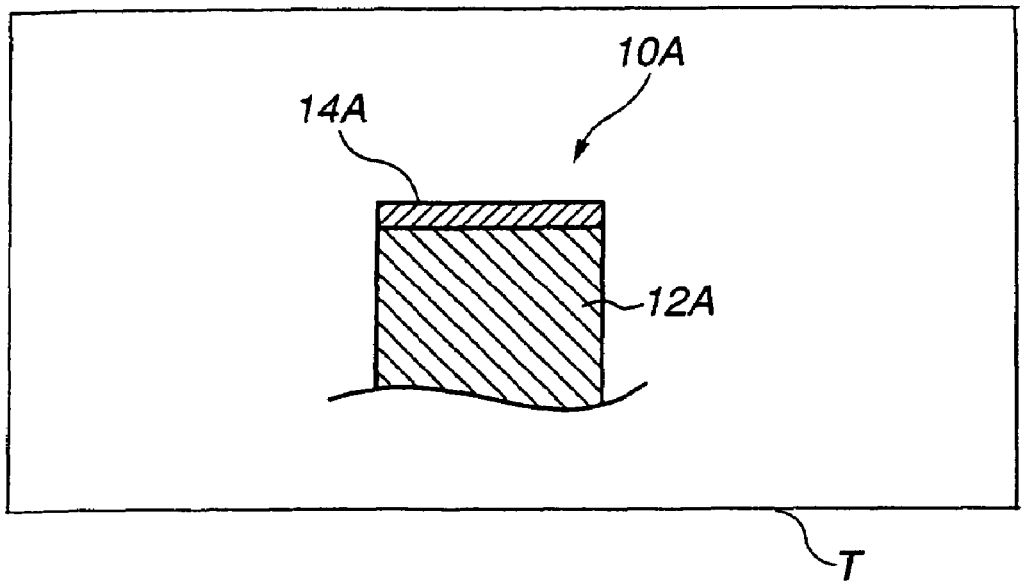
FIG. 2 is a fragmentary sectional view of a tooth of a gear used in an automatic transmission, as another embodiment of a low-friction sliding member according to the present invention.

A low-friction sliding member in an automatic transmission is at least one of sliding members which are in slidable contact with each other in the presence of a continuously variable transmission oil or fluid (composition) which may be referred to as "ATF (composition)". The low-friction sliding member has a sliding section whose sliding surface is coated with a hard carbon thin film. The automatic transmission oil (lubricating oil) contains at least one of an organic oxygen-containing compound and an aliphatic amine compound as ashless friction modifier(s). By virtue of this automatic transmission oil, at least one of the sliding surfaces of the sliding members is coated with the hard carbon thin film, and therefore the sliding members can be in slidable contact with each other with an extremely low friction as compared with that in conventional techniques. Examples of the low-friction sliding member are gears, rotatable shafts, parts of bearings, and the like in the continuously variable transmission T. FIG. 2 shows a part of a tooth 10A of a gear used in the automatic transmission. The gear tooth 10A includes the base material 12A having the sliding surface which is coated with the hard carbon thin film 14A.

The hard carbon thin film is formed of, for example, DLC (diamond-like carbon) material which is mainly constituted of carbon atom and amorphous. The DLC material takes a diamond structure (SP$^3$ bonding) and/or a graphite structure (SP$^2$ bonding) in bonding mode among carbons. More specifically, the hard carbon (DLC) thin film 1a is formed of hydrogen-free amorphous carbon (a-C) that consists of carbon, hydrogen-containing amorphous carbon (a-C:H), or metal carbide or metal carbon (MeC) that contains as a part a metal element of titanium (Ti) or Molybdenum (Mo).

As a hydrogen content in the hard carbon thin film increases, the friction coefficient increases. Accordingly, in the present invention, it is necessary that the upper limit of the hydrogen content in the hard carbon thin film is 20 atomic %. In order to sufficiently lower the friction coefficient in the lubricating oil during sliding and to obtain a stable sliding characteristics, the hydrogen content in the hard carbon thin film is preferably not more than 10 atomic %, and more preferably not more than 0.5 atomic %.

The hard carbon thin film having such a low hydrogen content is obtained by a PVD process that substantially does not use hydrogen and/or hydrogen-containing compound, such as a sputtering process or an ion plating process. In this case, it is preferable to carry out a film-forming operation for the hard carbon thin film upon baking of a reactor and tools for supporting the base material and upon sufficiently cleaning the surface of the base material in order to reduce the hydrogen content in the hard carbon thin film, in addition to using gas containing no hydrogen during the film-forming operation.

The hard carbon thin film is formed on the surface of a base material. Since the film thickness of the hard carbon thin film is considerably small, the surface roughness of the base material in a condition before the hard carbon thin film is formed largely affects the surface roughness of the hard carbon thin film formed on the surface of the base material. Accordingly, the surface roughness (center line average roughness) Ra of the base material is preferably not larger than 0.1 μm in the condition where the base material has not yet been coated with the hard carbon thin film. If the surface roughness of the base material exceeds 0.1 μm, projecting portions due to the surface roughness of the hard carbon thin film increases a local Hertz's contact pressure to an opposite member, thereby resulting in induction of formation of crack in the hard carbon thin film. The surface roughness Ra is explained as $R_{a75}$ in JIS (Japanese Industrial Standard) B 0601 (:2001).

The hard carbon thin film preferably has a surface hardness or micro Vickers hardness (Hv) ranging from 1000 to 3500 as measured under application of a 10 g load and a thickness ranging from 0.3 to 2.0 μm. If the surface hardness and thickness of the hard carbon thin film are out of the above ranges, wear of the hard carbon thin film will occur in case that the surface hardness (Hv) is smaller than 1000 and the thickness is smaller than 0.3 μm, whereas peeling-off of the hard carbon thin film tends to occur in case that the surface hardness (Hv) exceeds 3500 and the thickness exceeds 2.0 μm.

The low-friction sliding member of this embodiment is particularly effective to be used as sliding members of an automatic transmission which sliding members have respective sliding surfaces which are in slidable contact with the sliding surfaces of the opposite members which are formed of an iron-based material or an aluminum alloy, in presence of the automatic transmission oil provided between the contactable sliding surfaces. The automatic transmission of this embodiment excludes the continuously variable transmission and therefore means a transmission in which speed-changing operation is discontinuously or stepwise made.

Next, the automatic transmission oil used for the continuously variable transmission will be discussed.

The automatic transmission oil preferably contains a base oil, and at least one of organic oxygen-containing compound and aliphatic amine compound as ashless friction modifier(s). It is to be noted that an extremely excellent low friction characteristics can be obtained in presence of the transmission oil at the sliding surface coated with the hard carbon thin film.

The base oil, the organic oxygen-containing compound and the aliphatic amine compound of the automatic transmission oil are the same as those used in the continuously variable transmission oil in connection with the first embodiment. Additionally, the automatic transmission oil in this embodiment may contain other components than the base oil, the organic oxygen-containing compound and the aliphatic amine compound, used in the continuously variable transmission oil.

Experiment 2

The invention is described more concretely with reference to the following Examples and Comparative Examples, which, however, are not intended to restrict the scope of the invention.

[Fabrication of Sliding Members]

A carburized SCM420 steel was used as a base material. This was formed into blocks and rings of the sizes defined by Falex Corporation for LFW-1 test (see "LFW-1 Test Condition" mentioned below).

Block:

Blocks of SCM420 steel were carburized and tempered at a low temperature, and their sliding face was polished and finished with a wrapping tape to have a surface roughness Ra of 0.03 μm. The surface of the thus-processed blocks was optionally processed by PVD or CVD to be coated with a coating material so as to form thereon a coating layer (hard carbon thin film) having a thickness of 1.1 μm, followed by being further polished and finished with a wrapping tape to have a surface roughness Ra of 0.03 μm.

Ring:

Rings of SCM420 steel were carburized and tempered at a low temperature, and their sliding face was polished and finished with a wrapping tape to have a surface roughness Ra of 0.04 μm. The details of the blocks and the rings thus prepared are the same as those summarized in Table 3.

TABLE 3

| | Ring | | | Block | | | | | | |
|---|---|---|---|---|---|---|---|---|---|---|
| Kinds of sliding members | Base material (substrate) | Surface Roughness Ra, μm | Surface Hardness HRC | Base material (substrate) | Surface roughness Ra, μm | Surface hardness HRC | Coating material | Thickness, μm | Surface roughness Ra, μm | Surface hardness Hv |
| A1 | SCM420 carburized steel | 0.04 | 59 | SCM420 carburized steel | 0.03 | 59 | a-C | 1.1 | 0.03 | 1850 |
| B1 | SCM420 carburized steel | 0.04 | 59 | SCM420 carburized steel | 0.03 | 59 | DLC (a-C:H) | 1.1 | 0.03 | 1850 |
| C1 | SCM420 carburized steel | 0.04 | 59 | SCM420 carburized steel | 0.03 | 59 | none | — | — | — |

Note:
HRC indicates Rockwell hardness (C-scale).

[Preparation of ATF Composition]

A paraffin-based mineral oil (having a kinematic viscosity at 100° C. of 4.3 mm²/sec) was prepared as a base oil. A fatty acid ester, aliphatic amine, amide or alcohol friction modifier, and ATF package additive and polymethacrylate were suitably added to it to prepare a ATF composition. The resulting ATF composition was combined with the above-mentioned sliding members as in Examples 2-1 to 2-11 and Comparative Examples 2-1 and 2-2. The details of these Examples and Comparative Examples are shown in Table 5.

In Table 4, the fatty acid ester is glycerin monooleate; the commercial product ATF is Nissan genuine oil "Matic-J", and this ATF contains a friction modifier; and the ATF package additive contains a friction modifier.

TABLE 4

| | Example | | | | | | | | | | | | Comparative example |
|---|---|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 | 2-12 | 2-1 |
| Sliding members | A1 | A1 | A1 | A1 | A1 | A1 | A1 | B1 | B1 | B1 | B1 | B1 | C1 |
| Base oil (%) | 79.3 | 79.3 | 79.3 | 79.3 | 80 | 78.5 | (commercial product, ATF) | 79.3 | 79.3 | 79.3 | 79.3 | 80 | 79.3 |
| Fatty acid ester (%) | 0.7 | — | — | — | — | 1.5 | | 0.7 | — | — | — | — | 0.7 |
| Aliphatic amine (%) | — | 0.7 | — | — | — | — | | — | 0.7 | — | — | — | — |
| Amide (%) | — | — | 0.7 | — | — | — | | — | — | 0.7 | — | — | — |
| Alcohol (%) | — | — | — | 0.7 | — | — | | — | — | — | 0.7 | — | — |
| ATF package additive (%) | 10 | 10 | 10 | 10 | 10 | 10 | | 10 | 10 | 10 | 10 | 10 | 10 |
| Polymethacrylate (%) | 10 | 10 | 10 | 10 | 10 | 10 | | 10 | 10 | 10 | 10 | 10 | 10 |
| Friction coefficient | 0.035 | 0.04 | 0.04 | 0.035 | 0.04 | 0.03 | 0.035 | 0.07 | 0.08 | 0.08 | 0.08 | 0.11 | 0.1 |

[Performance Evaluation]

According to the LFW-1 test method defined in ASTM D2714, the samples were tested under the test condition mentioned below. From the friction force of each sample (the block) in 60 minutes after the start of the test, the friction coefficient thereof was calculated. The results obtained are shown in Table 4.

LFW-1 Test Condition:

Test Device: Falex Block-on-Ring Friction and Wear Testing Machine produced by Falex Corporation;

Test Piece: Block (Falex Type H-60)

Ring (Falex Type S-10);

Sliding Velocity: 0.26 m/sec;

Load: 222.5 N;

Oil Temperature: 110° C.; and

Test Period: 60 minutes.

From Table 4, it is understood that the combination of the friction modifier and DLC (a-C) brings about a great friction-reducing effect as compared with the case of DLC (a-C:H) alone or the case with no coating. At present, it is believed that Example 2-6 will be the best in point of the friction-reducing effect thereof.

As described hereinabove, in this embodiment, a certain automatic transmission oil composition is present in the site between the sliding member coated with the hard carbon thin film and an opposite member formed of any material. Accordingly, this embodiment provides a low-friction sliding member in continuously variable transmissions, the advantages of which are that its friction is extremely low and stable and it has good wear resistance, providing an automatic transmission oil composition for it.

While the hard carbon thin film (for example, of the diamond-like carbon) has been described as being formed or obtained by the PVD process in the embodiments, it will be understood that the hard carbon thin film may be formed by a CVD process.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A low-friction sliding member in a transmission, the sliding member being at least one of a plurality of sliding members which are in slidable contact with each other in the presence of a transmission oil composition, the low-friction sliding member comprising:

a base material having a sliding section; and a hard carbon thin film coated on a sliding surface of the sliding section of the base material, wherein the transmission oil composition comprises at least one of an organic oxygen-containing compound and aliphatic amine compound, wherein the transmission comprises a continuously variable transmission, and wherein the hard carbon thin film contains hydrogen in an amount not more than 0.5 atomic %.

2. A low-friction sliding member as claimed in claim 1, wherein the sliding section of the base material has a surface roughness (Ra) not larger than 0.1 μ in a condition before the base material is coated with the hard carbon thin film.

3. A low-friction sliding member as claimed in claim 1, wherein the hard carbon thin film has a surface hardness (Hv) ranging from 1000 to 3500 in micro Vickers hardness as measured under application of a 10 g load, and a thickness ranging from 0.3 to 2.0 μm.

4. A low-friction sliding member as claimed in claim 1, wherein the hard carbon thin film comprises amorphous DLC and is formed by a physical vapor deposition process.

5. A low-friction sliding member in a transmission, the sliding member being at least one of a plurality of sliding members which are in slidable contact with each other in the presence of a transmission oil composition, the low-friction sliding member comprising:

a base material having a sliding section; and a hard carbon thin film coated at a sliding surface of the sliding section of the base material, wherein the transmission oil composition comprises at least one of an organic oxygen-containing compound and aliphatic amine compound,
wherein the transmission comprises an automatic transmission, and
wherein the hard carbon thin film contains hydrogen in an amount not more than 0.5 atomic %.

6. A low-friction sliding member as claimed in claim 5, wherein the sliding section of the base material has a surface roughness (Ra) not larger than 0.1µ in a condition before the base material is coated with the hard carbon thin film.

7. A low-friction sliding member as claimed in claim 5, wherein the hard carbon thin film has a surface hardness (Hv) ranging from 1000 to 3500 in micro Vickers hardness as measured under application of a 10 g load, and a thickness ranging from 0.3 to 2.0 µm.

8. A low-friction sliding member as claimed in claim 5, wherein the hard carbon thin film comprises amorphous DLC and is formed by a physical vapor deposition process.

\* \* \* \* \*